United States Patent
Salkini

(10) Patent No.: US 12,554,019 B1
(45) Date of Patent: Feb. 17, 2026

(54) SYSTEMS AND METHODS FOR LEVERAGING GLOBAL POSITIONING REPEATERS TO LOCATE DEVICES AND TO OBFUSCATE DEVICE LOCATION

(71) Applicant: Tecore, Inc., Hanover, MD (US)

(72) Inventor: Jay Salkini, Cocoa, FL (US)

(73) Assignee: Tecore, Inc., Hanover, MD (US)

( * ) Notice: Subject to any disclaimer, the term of this patent is extended or adjusted under 35 U.S.C. 154(b) by 0 days.

(21) Appl. No.: 18/731,500

(22) Filed: Jun. 3, 2024

Related U.S. Application Data

(63) Continuation of application No. 17/972,045, filed on Oct. 24, 2022, now Pat. No. 12,000,934, which is a continuation of application No. 16/666,216, filed on Oct. 28, 2019, now Pat. No. 11,480,687.

(60) Provisional application No. 62/777,057, filed on Dec. 7, 2018.

(51) Int. Cl.

| | |
|---|---|
| *G01S 19/01* | (2010.01) |
| *G01S 19/05* | (2010.01) |
| *G01S 19/11* | (2010.01) |
| *G01S 19/25* | (2010.01) |
| *G06F 21/14* | (2013.01) |
| *G06F 21/62* | (2013.01) |
| *H04B 7/19* | (2006.01) |
| *H04B 7/195* | (2006.01) |
| *H04W 4/02* | (2018.01) |
| *H04W 4/021* | (2018.01) |
| *H04W 4/029* | (2018.01) |

(52) U.S. Cl.
CPC ............ *G01S 19/015* (2013.01); *G01S 19/05* (2013.01); *G01S 19/11* (2013.01); *G01S 19/252* (2013.01); *G01S 19/258* (2013.01); *G06F 21/14* (2013.01); *G06F 21/6254* (2013.01); *H04B 7/195* (2013.01); *H04W 4/021* (2013.01); *H04W 4/029* (2018.02); *G06F 2221/2111* (2013.01)

(58) Field of Classification Search
CPC ........ G01S 19/015; G01S 19/05; G01S 19/11; G01S 19/215; H04W 4/021; H04W 4/029
See application file for complete search history.

(56) References Cited

U.S. PATENT DOCUMENTS

| | | | |
|---|---|---|---|
| 10,620,319 B2 * | 4/2020 | Bieber | G01S 19/015 |
| 2006/0208946 A1 * | 9/2006 | Bailey | G01S 19/11 |
| | | | 342/386 |

* cited by examiner

*Primary Examiner* — Cassi J Galt

(57) ABSTRACT

A system for obfuscating locations of mobile devices and for simultaneously determining and reporting both actual locations and obfuscated locations of the mobile devices operating in a wireless communications network includes a receive section in wireless communication with a mobile device over the network, and in communication with geoposition satellites (GPS), the receive section including GPS receive antennae coupled by a corresponding cable to corresponding ones of GPS repeaters. The system further includes a monitoring section in communication with the mobile device. The monitoring section includes a processor that accesses a mapping table relating an actual GPS repeater location to an obfuscated GPS repeater location in which the mobile device obfuscated location is the obfuscated location of a nearest GPS repeater and the actual location of the mobile device is the obfuscated location of the GPS repeater minus an obfuscation offset. The processor reports mobile device actual and obfuscated locations.

21 Claims, 19 Drawing Sheets

SYSTEMS AND METHODS FOR LEVERAGING GLOBAL POSITIONING REPEATERS TO LOCATE DEVICES AND TO OBFUSCATE DEVICE LOCATION

RELATED APPLICATIONS

This application is a continuation of U.S. patent application Ser. No. 17/972,045, filed Oct. 24, 2022, entitled SYSTEMS AND METHODS FOR LEVERAGING GLOBAL POSITIONING SYSTEM REPEATERS TO LOCATE DEVICES AND OBFUSCATE DEVICE LOCATION, which is a continuation of U.S. patent application Ser. No. 16/666,216, filed Oct. 28, 2019, entitled SYSTEMS AND METHODS FOR LEVERAGING GLOBAL POSITIONING SYSTEM REPEATERS TO LOCATE DEVICES AND OBFUSCATE DEVICE LOCATION, now U.S. Pat. No. 11,408,687, issued Oct. 25, 2022. This application also claims priority to provisional patent application 62/772,057 filed Nov. 27, 2018, entitled SYSTEMS AND METHODS FOR LEVERAGING GLOBAL POSITIONING SYSTEM REPEATERS TO LOCATE DEVICES AND OBFUSCATE DEVICE LOCATION. The content of the provisional patent application is incorporated by reference.

BACKGROUND

As wireless technology has advanced, the inclusion of wireless mobile device location information has become an important part of the operational capabilities of any wireless network. Given both the public safety requirement and the commercial value of mobile device location information, the wireless industry has developed systems and methods to pinpoint the location of mobile devices with great accuracy and at any time. These methods include trilateration and multilateration through a variety of procedures that rely on signals from Global Positioning Systems (GPS) satellites. One problem with relying of GPS signals is that, although GPS provides high accuracy in positioning when outdoors, the GPS signal may not be received with sufficient strength and from enough satellites when a GPS receive is inside a building or structure because of the large signal attenuation caused by the building walls. None the less, Global Positioning System (GPS) have received widespread use in many applications such as traffic management, navigation, medical emergency services as well as location-based services for mobile devices. Although GPS positioning is prevalent in outdoor applications, indoor localization using GPS is not common because of the large signal attenuation caused by the building walls. Most indoor positioning solutions require unique infrastructure that is complicated and expensive to deploy. The specific application and resulting precision of these methods when implemented in a communications network typically is determined, at least in part, by the density of mobile devices and the economics of the area encompassed by the communications network. As wireless communications move from the 4th to the 5th generation, the use of location information will be a key element of commercial services and communications network operations.

FIG. 1 illustrates a typical current use of geolocation systems to pinpoint the location of a mobile device in area. In this example, an operator of a mobile device wishes to locate a specific type of entity such as, for example, Italian restaurants. To find the restaurants, the operator may access, from the mobile device, a commercially-available GPS service (not shown) that will provide the desired information, typically in the form of a map or display. The GPS service begins by acquiring, from the mobile device, its geographical location. The mobile device acquires its GPS location by querying a constellation of GPS satellites and computing the mobile device location using the data provided by a number (typically four) of such satellites. Display 10 of FIG. 1 shows an example of the information that may be presented on the mobile device. In FIG. 1, display 10 is a map showing the mobile device location at pin 11. Also shown in display 10 are pins 12 and 13 for Italian restaurants located by the GPS service based on the mobile device's reported GPS location. The mobile device operator selects the Italian restaurant at pin 13, and the GPS service produces route 14 connecting the mobile device at pin 11 with the Italian restaurant at pin 13.

SUMMARY

In an example, a method for using global positioning system (GPS) repeaters to obfuscate a location of a mobile device operating in an area of a communications network, the communication network including a monitoring system, includes receiving an indication that the mobile device enters the communications network; requesting a GPS location from the mobile device; receiving repeated GPS information from the mobile device; calculating a obfuscated location of the mobile device; mapping the obfuscated location of the mobile device to a table of defined locations to produce an actual mobile device location; and reporting the actual location of the mobile device.

In another example, a system uses global positioning system (GPS) repeaters to obfuscate locations of mobile devices includes one or more GPS receive antennas. Each GPS receive antenna receives GPS signals comprising satellite data and information from three or more GPS satellites. The system further includes one or more GPS repeaters configured to provide repeated GPS satellite data and information received by the GPS receive antennas. One or more GPS receivers may be located adjacent a GPS repeater, the GPS receiver configured to provide a computed GPS location of the GPS receiver, the computed GPS location comprising a three-dimensional geographic location of the GPS receiver. A cable connects each of the GPS receive antennas with corresponding ones of the GPS repeaters. The cable sized to impose an obfuscating extension of a time of transmission of the GPS satellite data and information from the GPS antenna to the GPS repeater to cause an offset in a computed GPS location performed by the GPS receiver compared to an actual location of the GPS receiver, and the offset sufficient to obfuscate the actual location of the GPS receiver.

In yet another example, a system, implemented at a facility, for leveraging GPS repeaters to located devices and to obfuscate device location includes a GPS receive section comprising a GPS receive antenna placed and operable to receive GPS satellite data and information from a constellation of GPS satellites, a GPS repeater provided within the facility, the GPS repeater configured to broadcast a modified form of the GPS satellite data and information, a cable coupling the GPS receiver and the GPS antenna, and configured to include an extension length that imposes an extended time of transmission between the GPS receiver and the GPS receive antenna, the extended time comprising time in excess of a time of transmission based on an efficient routing distance and time for the cable between the GPS receive transmitter and the GPS receiver, wherein the efficient time and the extended time modify the form of the GPS satellite data and information; and a GPS monitoring section. The GPS monitoring section includes a computer processor, and a non-transitory computer-readable storage medium comprising machine instructions and a GPS mapping table. The processor receives an obfuscated GPS location computed by the mobile device from the modified form of the GPS satellite data and information, and applies the obfuscated GPS location to the GPS mapping table to determine an actual location of the mobile device.

In still another example, a method for using global positioning system (GPS) repeaters to obfuscate a location of a mobile device operating in a confined area of a communications network, the communications network including a GPS receive antenna coupled to a GPS repeater by a signal cable, and a monitoring section, includes receiving at the monitoring section an indication that the mobile device entered the confined area of the communications network; the monitoring section prompting a location update from the mobile device; receiving an obfuscated GPS location from the mobile device, the obfuscated GPS location differing from an actual location of the mobile device by an offset distance, the offset distance based on a time of signal transmission extension imposed by a length of the cable coupling the GPS antenna and the GPS repeater; and the monitoring section mapping the obfuscated GPS location of the mobile device to a table of defined locations to produce the actual mobile device location.

DESCRIPTION OF THE DRAWINGS

The Detailed Description refers to the following drawings in which like numerals refer to like items, and in which.

DETAILED DESCRIPTION

Mobile device location information may be a commercially valuable part of wireless communications network's operations. Mobile device location information may be provided quickly and with great accuracy. Mobile device location information may support applications that provide directions for mobile device operators, marketing and sales applications, and data analytics tracking behavior, for example. Mobile device location may be obtained by leveraging the Global Positioning System (GPS). Note that although mobile device location information is discussed herein in the context of GPS as an exemplary satellite navigation system, other systems, including GLONASS (Russian), and Galileo (Europe) are included within the scope of the herein disclosed systems and methods, and should be understood to fall under the umbrella of systems collectively referred to as GPS herein.

More generally, from a commercial perspective, mobile device location information may allow for directed services and capabilities within a communications network coverage area. The definition of a "walled garden" based on the mobile device location used to determine the service capability is a hidden layer of control leveraged by network service providers to optimize network utilization as well as directed services and capabilities based on the location of the mobile device. Over time, this walled garden concept has evolved from its first instantiation, which was developed to provide a measure of control for network operator's service boundaries to today's ubiquitous service, and increasing bandwidth demand has changed the focus from controlling service boundaries to monetizing location information across a large range of services.

While mobile device operations are an ever-present factor in supplying services, a need may exist to restrict mobile device usage in certain well-defined security and public safety situations. In many of the highest security situations (e.g., prisons, secured facilities, high value infrastructure), the nature of the environment is not conducive to the control of wireless communications service. These environments would benefit from systems and methods that allow for the use of mobile device location to implement service controls as well as to enhance the security of the facility.

However, although mobile device location information may provide an improved level of security in communications network operations, and in many key security scenarios, mobile device location information could be used to limit or restrict service, traditional mobile device location calculation methods may not be allowed or operational in certain security facilities and environments.

Figure 1:
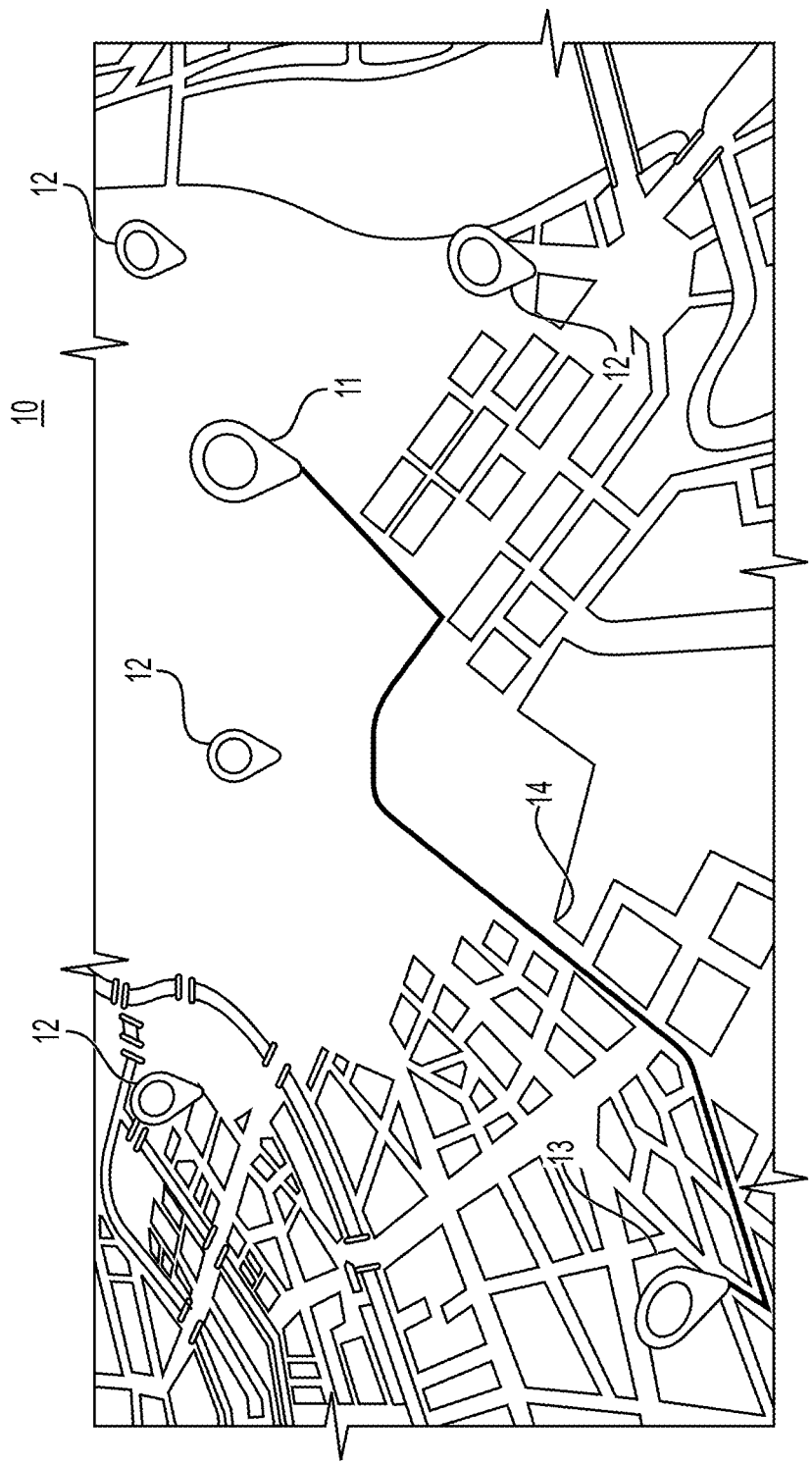
FIG. 1 illustrates a typical, current use of geo-positioning systems to pinpoint the location of a mobile device.

Thus, despite a widespread buildout of wireless communications coverage, situations still exist where mobile device location information is desired but the wireless communications network and/or the environment cannot support the requisite mobile device location using only current, traditional mobile device location methods, such as that shown in FIG. 1. These scenarios may be driven by limitations of the physical environment or the economics of the desired service area not supporting a deployment of the required mobile device location infrastructure and technology. If the necessary location techniques are not operational in a particular service area, the most common result is no location data are provided. This lack of location information may adversely affect services and systems that rely on mobile device location information in their operation.

In certain structures and areas, traditional GPS location methods are not possible due to the construction of the facility; in other structures and areas, it may not be economically feasible to outfit a structure or area with traditional mobile device location calculation equipment. Additionally, location methods may be limited further in situations where a user opts-out of mobile device location sharing.

When considering security-based location services, public safety, security protocols, and limits on permissible communications may require a distinction between areas of allowed mobile device operation and areas of non-allowed mobile device operation. If the location of the mobile device can be determined with a relatively high certainty, this information may be used to determine the security levels to provide to the mobile device. However, in these same situations, transmission of precise mobile device location data may create a security concern and may compromise facility security.

Another aspect of security-based location services is that the services must be operational regardless of any opt-in/out settings of the mobile device. Alternate methods may be implemented to provide supplemental information that delivers a less granular mobile device location approximation. When precise mobile device location is not required, these methods may increase the success rate of mobile device location-aware applications that are provided in controlled or restricted environments and facilities.

As noted above, traditional GPS location systems and methods (see FIG. 1) may prove to be unsatisfactory in some commercial environments. A common location calculation method supported across mobile devices and networks uses GPS or assisted GPS to compute accurate and reliable mobile device location information. Mobile devices may provide their location information, received, for example, from numerous (typically four or more) GPS satellites, and processed onboard the mobile device to compute the mobile device location, before transmission over the communications network. The GPS information may be processed to determine the relative location of the mobile device based on the delay of signal information reception, at the mobile device, from each satellite of a group of GPS satellites. The method results in location calculation that may be within a few feet or even inches of the actual mobile device. However, as noted herein, leveraging GPS satellites for location-related information becomes a challenge when the mobile device is not able to receive the satellite information, such as when a mobile device does not have a view to a sufficient number of satellites. This situation may occur when a mobile device is shielded from satellite view by tall buildings, is in a building, or is underground, and thus, locating a mobile device by GPS may not be possible.

To overcome limitations of traditional GPS location systems and methods, disclosed herein are systems and methods that invoke mapped GPS locations to associate an actual area or actual location of a mobile device with an obfuscated set of location data. The mapped GPS locations generated by the systems and methods also may be used to provide location information for areas not covered by traditional communications device location methods. In these contexts, communications devices include fixed and mobile phones (e.g., smart phones), computers (e.g., lap top computers and desktop computers, fixed or moveable (and moving)) and other portable devices (tablets) and fixed devices. Hereafter, for ease of description, the term "mobile device" generally is used; however, it should be understood that the herein disclosed systems and methods may apply to any device, fixed or mobile, that is capable of or responsive to geo-location (particularly by GPS satellite location), regardless of the geo-location process that is employed. As disclosed elsewhere herein, examples of the systems and methods may be applicable for security applications as well as government and military use, and in particular, for scenarios where precise location information is either not available or scenarios where mobile device use is restricted, and when disclosure of actual mobile device location could pose a security or public safety risk. Thus, to address situations in which traditional mobile device location methods cannot be used due either to technology incompatibility or to lack of economic feasibility, the herein disclosed systems may implement GPS location mapping. The herein disclosed GPS location mapping, and related methods to obfuscate actual mobile device locations, may employ specific GPS location computation techniques to provide mobile device locations in many traditional and non-traditional situations and environments. By leveraging known characteristics of a particular mobile device location with the information reported by the mobile device, the systems may compute an obfuscated mobile device location that, without a corresponding translation, results in an apparent and reported mobile device location that differs from the actual mobile device location.

Figure 2:
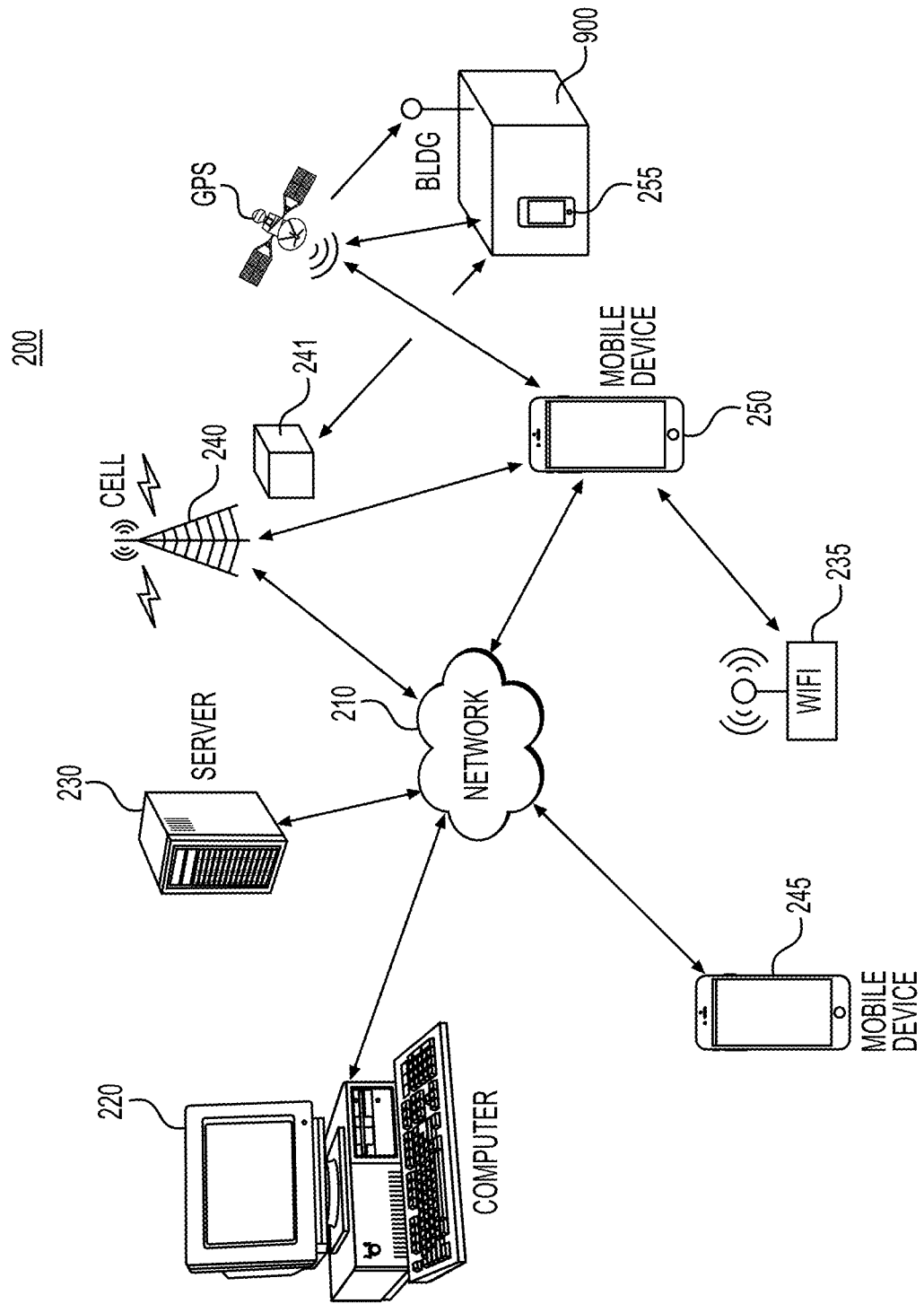
FIG. 2 illustrates an example environment/facility in which obfuscated geo-location may be employed.

FIG. 2 illustrates environment 200 in which may operate the herein disclosed system for leveraging GPS repeaters to locate mobile devices and, in some examples, to obfuscate the mobile device location. In FIG. 2, communications network 210 connects various devices and their applications, including computer 220, server 230, router 235, cell tower 240 and associated RF control, reception, and distribution equipment 241 that may be used to establish a cellular communications network, and mobile devices 245, 250, and 255 (note that computer 220 may be mobile or fixed). As can be seen in FIG. 2, mobile device 255 is located within the volume of building 900. Operation of mobile device 255 in building 900 is described in more detail herein, including with reference to FIG. 9. Also shown in FIG. 2 is GPS satellite 260. As one skilled in the art would appreciate, multiple GPS satellites (a minimum of three and preferably four or more such GPS satellites) are used to locate mobile devices, and thus GPS satellite 260 represents a constellation of GPS satellites that may be in the view of the mobile devices 245 and 250 (but not necessarily in the view of mobile device 255). The communications network 210 may be any type of network, including a local area network ("LAN"), such as an intranet, a wide area network ("WAN"), such as the Internet, or any combination thereof. The communications network 210 may include a cellular network capable of supporting any current technology and any future technology. Further, the communications network 210 may be a public network, a private network, or a combination thereof. The communications network 210 may be implemented using any type or types of physical media, including wired communication paths and wireless communication paths associated with one or more service providers. Additionally, the communications network 210 can be configured to support the transmission of messages formatted using a variety of protocols. Thus, the communications network 210 supports wired and wireless telephony, wired and wireless messaging, and wired and wireless data transmission. Finally, a local wireless network may be established as an overlay to the communications network 210. For example, an operator of building 900 may establish a local wireless network for the confines of building 900; that is, the local wireless network coverage area is confined to the boundaries of building 900. In environment 200, different devices may communicate with and send and receive commands and information to and from each other in various ways. Server 230, for example, may function as an intermediary between two or more devices such as computer 220, mobile device 245, mobile device 250, and mobile device 255.

Computer 220 may be configured to operate in the environment 200. The computer 220 may be any general-purpose computing device that can be configured to communicate with a Web-enabled application, such as through a Web browser. The computer 220 can be a personal computing device such as a desktop or workstation, or a portable computing device. The computer 220 includes a network connection (not shown) to the communications network 210. The network connection may be implemented through a wired or wireless interface, and may support bi-directional communications between the computer 220 and one or more other devices over the communications network 210. Besides a Web browser, the computer 220 may include an application for communicating with a Web-enabled application.

Application server 230 also may be configured to operate in the environment 200. The server 230 may be any computing device that can be configured to host one or more applications. For example, the server 230 can be a server, a workstation, or a personal computer. In an example, the server 230 can be configured as a collection of computing devices, e.g., servers, sited in one or more locations. The server 230 includes a network connection (not shown) to the communications network 210. The network connection may be implemented through a wired or wireless interface, and can support bi-directional communication between the server 230 and one or more other devices over the communications network 210. Further, the server 230 may be configured to host one or more applications. For example, the server 230 can be configured to host a remote management application that facilitates communication with one or more mobile devices connected with the communications network 210. The server 230 may pass messages sent from one device to another. For example, the server 230 may receive a request from mobile device 245 (the "requesting device") to locate another mobile device 250 (the "requested device"). In response to such a request (preferably after appropriate authentication and authorization steps have been taken to ensure the request is authorized by the user of the requested device), the server 230 may send a request to the requested device 250 and receive a response containing information relating to its location. The requested device 250 may have obtained this location information based on signals the requested device 250 received from, for example, GPS satellite 260. Having received a response, the server 230 then may send the information to the requesting device 245. Alternatively, the server 230 does not send a request to the requested device 250 because the server 230 has recent location information relating to the requested device 250 cached. In such an example, the server 230 may respond to a request by sending cached location information to the requesting device 245 without communicating with the requested device 250.

The devices 220, 245, 250, and 255 may have installed one or more location aware applications. Of these applications, some may have the functionality to send requests to other devices to enable a requesting mobile device to locate another mobile device. Upon receiving authorization to locate, a requesting device then may be able to send location requests to requested devices and receive responses containing the location of the requested device. In this scenario, authorization may be managed at the server level, but alternately or in addition, may be managed at the device level. Another application implemented on the devices 220, 245, 250, and 255 may require the device to provide its geographical location to another device. Yet another application implemented on the devices 220, 245, 250, and 255 may provide own-device location information to be used on board the mobile device. An example of this application is a GPS application that executes to compute and display the mobile device's location, such as for navigating in an automobile.

The devices 220, 245, 250, and 255 and the application server 230 may operate within a remote management framework to execute remote management functions. The server 230 may host a notification service application configured to support bi-directional communication over the communications network 210 between multiple devices in the environment 200. For example, the notification service application may permit a variety of messages to be transmitted and received by multiple devices. Each mobile device included in the environment 200 may include a network interface (not shown) configured to establish a connection to the communications network 210. For example, mobile device 245 may establish a cellular (e.g., GSM, EDGE, 3G, 4G, or 5G) network connection that provides data access to the communications network 210. Such a connection may be facilitated by one or more cellular towers 240, and accompanying RF control, reception, and distribution equipment, located within the range of the mobile devices 245, 250, and 255 and connected to the communications network 210. Further, mobile device 245 may establish an IEEE 802.11 (i.e., WiFi or WLAN) network connection to the communications network 210. Such a connection may be facilitated by one or more wireless network routers 235 located within the range of the mobile devices 245, 250, and 255 and connected to the network 210. Also, the mobile devices 245, 250, and 255 or an additional device may connect to the communications network 210 through the IEEE 802.16 (i.e., wireless broadband or WiBB) standard. Again, the devices 245, 250, and 255 may employ the assistance of a cell tower 240 or wireless router 235 to connect to the communications network 210.

Each of the mobile devices 245, 250, and 255 also may be configured to communicate with the notification service application hosted by the application server 230 to publish and receive messages. Further, each of the mobile devices 245, 250, and 255 can be configured to execute a remote management application or a remote management function responsive to a remote command received through the notification service application. In an example, the remote management application is integrated with the operating system of the mobile device. A mobile device may execute a remote command to perform one or more associated functions. For example, the remote commands can include locate commands, notification commands, and message commands. A message command may be used to present a text-based message on the display of a mobile device. A locate command may be used to cause a mobile device to transmit a message indicating its location at the time the locate command is executed. The locate command also may command the mobile device to use certain resources, such as an embedded GPS system, to determine its location.

In FIG. 2, the devices, except device 255 in building 900, may be considered to operate in a traditional manner using WiFi, cellular, and in some instances, wired communications over communications network 210. That is, the devices may be used for inter-device communication, including receiving and issuing commands (including, for example, a search command or a locate command) and receiving and sending information and data. Locations of the devices may be determined by GPS and cellular mechanisms and methods, and other mechanisms and methods. Thus, for example, the user of computer 220 may operate computer 220 to search for nearby automobile service stations, the operator of mobile device 245 may operate mobile device 245 to search for nearby Italian restaurants, and the operator of mobile device 250 may use mobile device 250 to locate mobile device 245 and to communicate with the operator of mobile device 245 by email, text (SMS) and voice. The communications network 210 supports other communications paths and applications.

However, mobile device 255 may not be able to communicate freely, in a traditional manner, with other devices shown in the environment 200 of FIG. 2. First, because it is located inside building 900, mobile device 255 may not have an unobstructed view of GPS satellite 260 or cell tower 240, or otherwise may be prevented from communication with cell tower 240 and GPS satellite 260. Similarly, mobile device 255 may not be able to access router 235. Second, building 900 may operate within a local wireless network and/or a LAN that is designed to prevent communication beyond the coverage area of building 900. For example, building 900 may be a prison or an embassy or may be any facility that requires a certain level of security to be maintained. Third, disclosure of an actual location of mobile device 255, either that it is inside building 900 at all, or that it is in a specific room or portion of building 900, might be a security breach. Yet, despite these possible restrictions, there may be a need or desire to determine and provide some location information related to mobile device 255. Thus, mobile device 255 may employ or be subject to non-traditional communications.

These non-traditional communications may be implemented by the herein disclosed systems and methods. In an example, the herein disclosed systems and methods, to overcome limitations of traditional GPS location systems and methods, may employ GPS repeaters that may generate repeated GPS reference points. Providing a repeated GPS reference point for mobile devices that otherwise do not have visibility to the necessary satellite information may facilitate the incorporation and use of traditional GPS location calculation methods. That is, for locations where proper or sufficient satellite information cannot be received by the mobile device, GPS repeaters may be installed to provide repeated GPS reference points, the data from which then may be used by the mobile device to self-determine and then report the mobile device location, or which simply may be forwarded to another device that computes the apparent location of the mobile device. The GPS repeaters may be installed with known characteristics of delay to allow a calculation of the mobile device actual location based on an offset factor corresponding to the known delay. That is, the known delay results in a calculation of an alternate or offset mobile device location. Note that the offset mobile device location may not be the actual location of the mobile device and, in an example, the offset mobile device location deliberately is not the actual mobile device location. In other words, the actual mobile device location deliberately is obfuscated. The alternate location then may be used as a reference to map to the actual mobile device location. In the example of FIG. 2, building 900, and mobile device 255, this mapping of computed GPS mobile device location to actual mobile device location could result in the reported (i.e., computed) location of mobile device 255 as outside building 900 while in actuality, mobile device 255 is inside building 900. This would be true were mobile device 255 to compute its GPS location or were mobile device 255 simply to pass GPS position parameters to a device (e.g., server 230) external to mobile device 255.

Figure 3A:
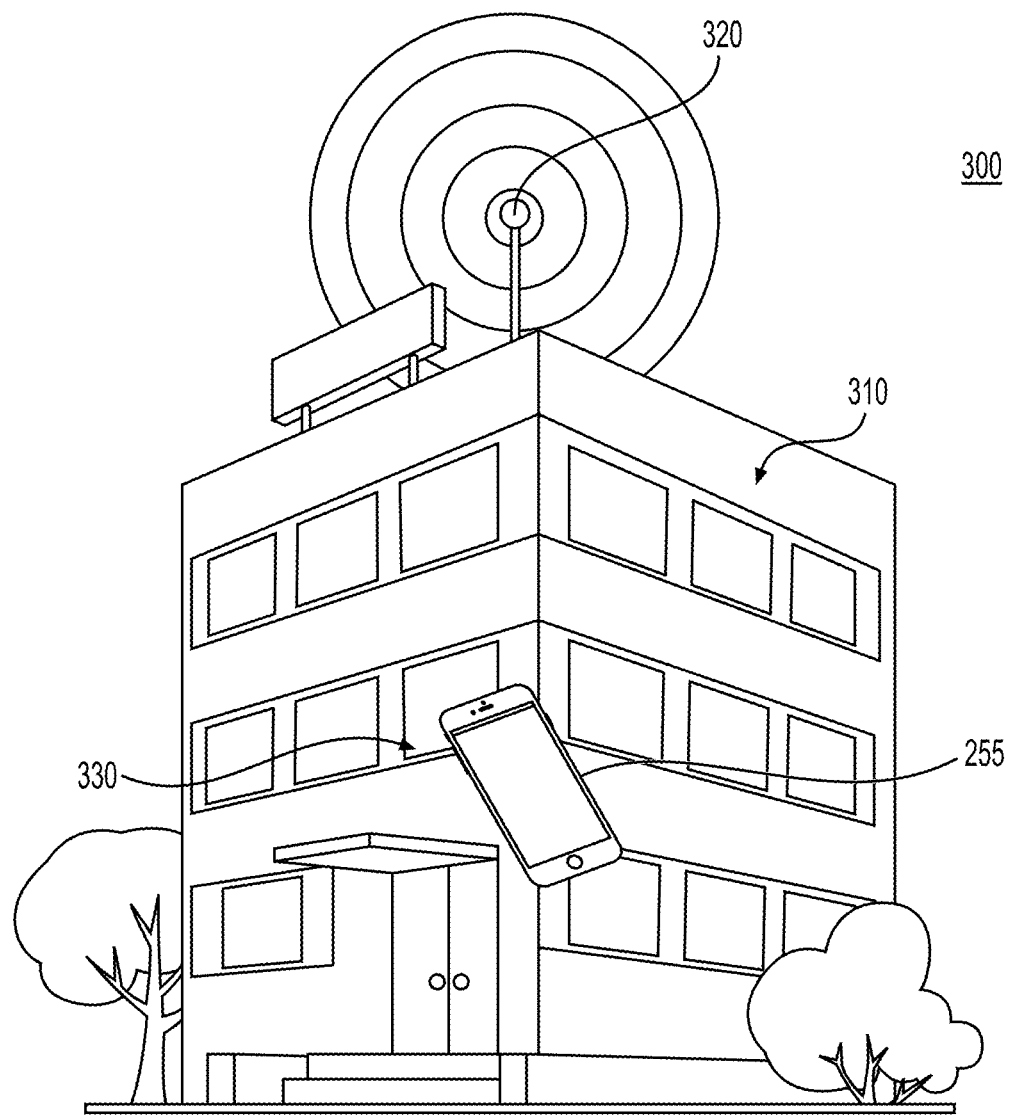
FIGS. 3A and 3B illustrate an example implementation in which a GPS repeater is employed to provide mobile device location, and in which the mobile device cannot adequately access GPS broadcast data.
Figure 3B:
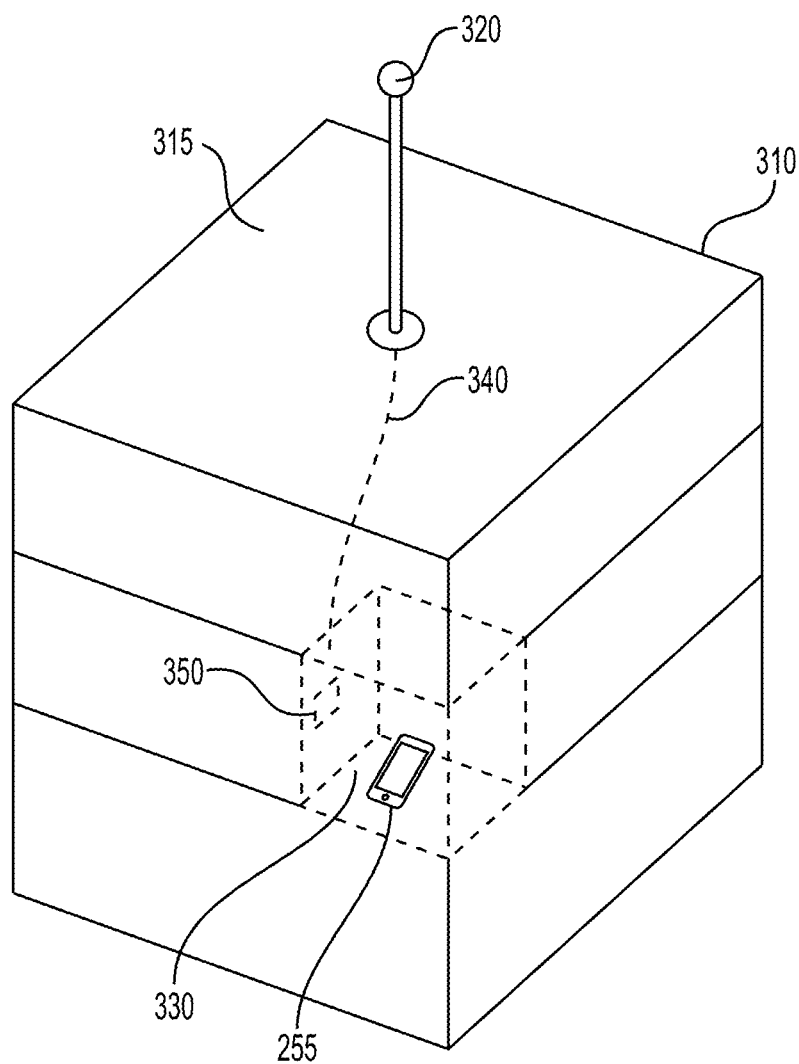
Figure 8A:
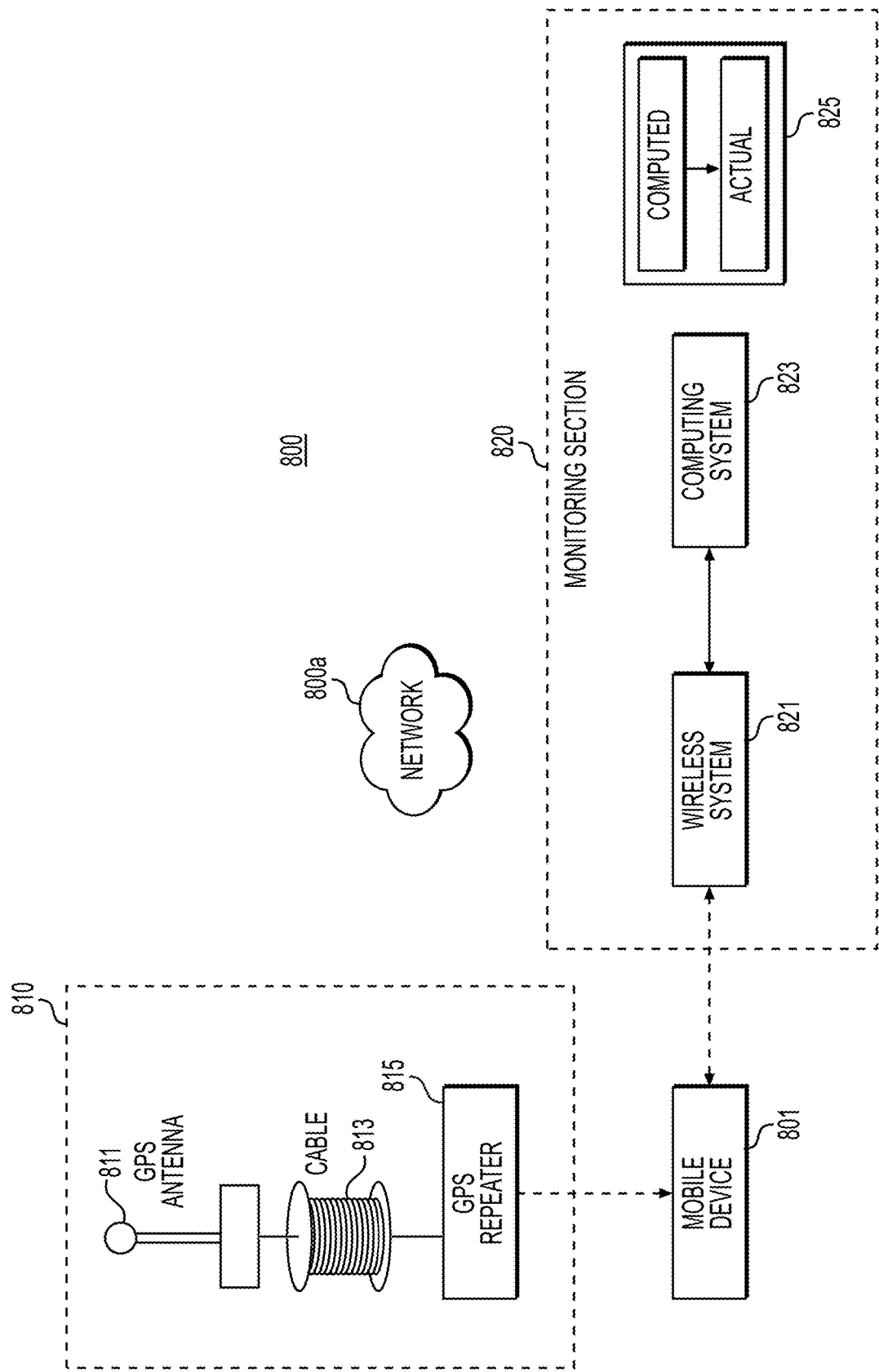
FIGS. 8A-8C illustrate an example system that provides mobile device location through obfuscation.
Figure 8B:
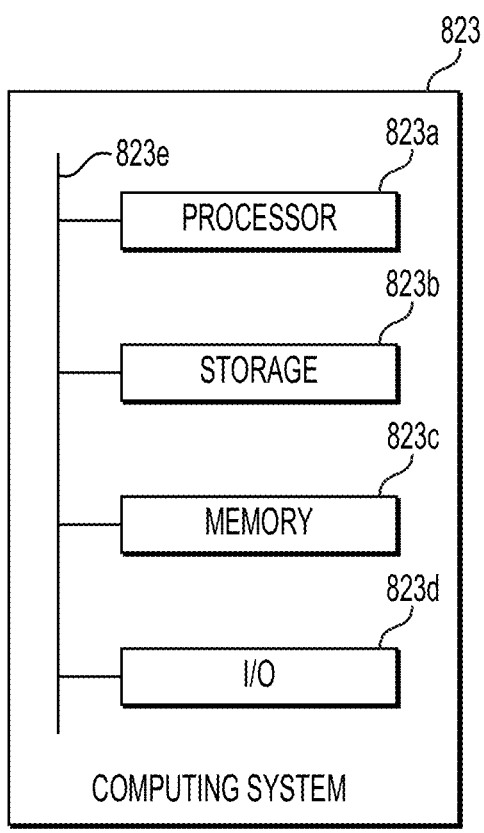
Figure 8C:
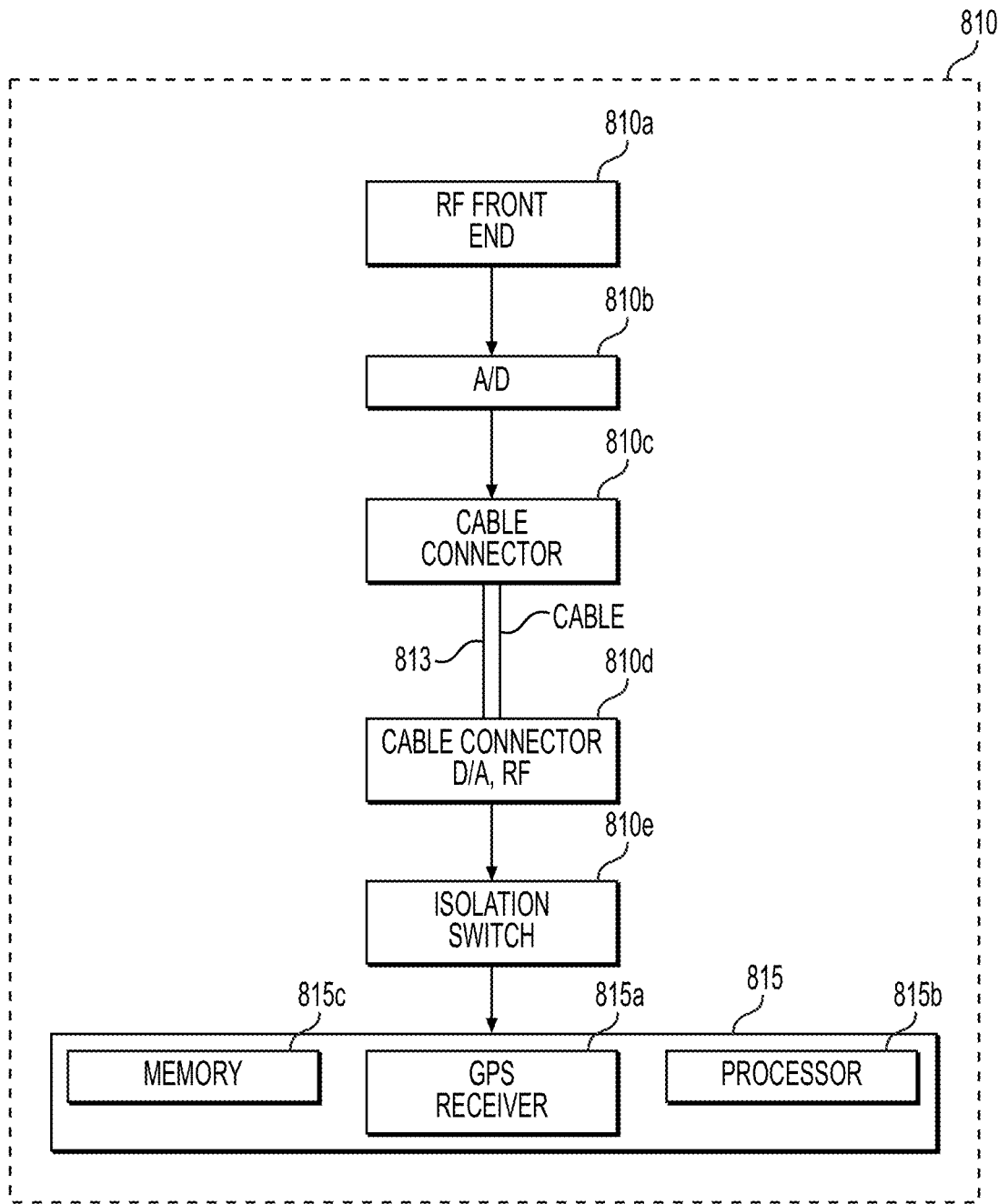

FIGS. 3A and 3B illustrates an example application of the operations of the herein disclosed systems. Referring to FIG. 3A, 3-story building 310 has installed, local GPS system 315, which is seen to include on the building rooftop, GPS antenna 320 that is connected to second story GPS repeater 350 by cable 340. GPS repeater 350 is located in room 330. The local GPS system 315 also may include a processing system (not shown in FIG. 3A, but an example of which is shown in FIGS. 8A-8C). Also located in second story room 330 is mobile device 255. Mobile device 255 includes an application (not shown) that allows mobile device 255 to receive and report its own location based on information requested by mobile device 255 from a set of GPS satellites 260. In an example, the GPS information is received at the building rooftop location, and then the GPS information is rebroadcast through GPS repeater 350 in room 330. The mobile device 255 then provides its GPS location information based on the location of the rooftop antenna with the added delay or offset imposed by cable 340. If the GPS antenna location is pre-mapped to the rebroadcast area of room 330 within building 310, an entity such as a merchant requesting the GPS will receive the location of the mobile device 255 based on the GPS location of the rooftop antenna 320 and the associated delay or offset imposed by cable 340 between the GPS antenna 320 and the GPS repeater 350. In an example, the mobile device 255 may compute the GPS location based on the GPS information at the rooftop plus the delay or offset. The location computed by the mobile device 255 then may be compared to a location grid or table of anticipated values for the targeted location of room 330. Several possibilities exist for the computed location. The computed location may be the actual location of the mobile device 255. Alternately, the computed location may be different from the actual location of the mobile device 255. The requesting entity may compute the location of the mobile device 255. The mobile device 255 may compute its own location, as is noted above. The computed location simply may be the geographic location of the GPS repeater 350, which is predetermined and fixed, and which is provided to the mobile device 255 in response to a location request from the media device 255. Several possibilities also exist for calculation of the actual location of the mobile device 255. The actual location of the mobile device 255 may be computed by the mobile device 255 using an appropriate GPS mapping table. The actual location of the mobile device 255 may be computed by another device external to the mobile device 255, with the mobile device 255 providing the received GPS parameters. In an aspect, such an external device could be included as a component of the building-wide GPS system 315, which in turn includes GPS antenna 320, GPS repeater 350, and intervening cable 340. Thus, the mobile device 255 may or may not, depending on the implementation, have its own actual location. In an aspect, the computed location and the actual location of the mobile device 255 may be determined by the length of the cable run of cable 340. However, to obfuscate the location of the mobile device 255, operators of building 310 may provide a length of cable that imposes an offset or delay beyond that which would be expected were cable 340 to traverse an essentially straight path between a rooftop antenna and a GPS repeater, with antenna and repeater on a same level or altitude or at different altitudes. In the example of FIG. 3A, the fact that GPS antenna 320 is on the building rooftop and the repeater 350 is on the building's second floor imposes some delay or offset that could, if not compensated for, result in a somewhat obfuscated GPS position for the mobile device 255. To address this situation, the GPS system 315 may be installed and then GPS repeater position(s) may be mapped to their exact location(s). An example of such a GPS mapping table is provided herein with respect to the description of FIG. 9. Note also that in the process of installing the GPS system 315 in building 310, the cable(s) 340 may be installed with such a length as to deliberately obfuscate the actual GPS location of the mobile device 255. As an example, cable 340 may be lengthened to impose a larger delay or offset than would occur were the cable run as short as possible. Stated differently, a GPS repeater ordinarily will be coupled to a GPS antenna by an optical or RF cable having a first length generally corresponding to a most efficient cable run, and ideally the most efficient cable run will be as straight a connection as possible between antenna and repeater. This "most efficient" cable run will impose a time of transmission delay on the GPS signal at the GPS repeater that is in addition to the time of transmission from GPS satellite to the GPS antenna. Hence, the most efficient cable run in effect modifies the form of the data and information received at the GPS antenna. In the herein disclosed systems, an additional time of transmission extension is imposed on the GPS signal received at the GPS antenna by inclusion of a second length of cable in addition to the first length of cable. The additional time of transmission extension results in a computation of a mobile device location that is obfuscated, and purposely does not represent the actual location of the mobile device. Thus, depending on the length of the cable run, the mobile device's computed GPS position could be outside building 310, for example, while mobile device 255 actually is in room 330. Note further that the granularity of the calculated location may be based on the number and locations of installed GPS repeaters.

Thus, once the GPS repeater infrastructure (e.g., GPS system 315) is installed, an area may be mapped out to determine GPS parameter sets (satellite information) provided from targeted locations within a building or area. These parameter sets then are mapped to individual locations within the building or area. When a mobile device reports a set of GPS parameters, the reported GPS parameters may be mapped to a previously determined location. To perform this mapping, the mapping device has stored in memory, the proper GPS mapping table. Thus, for example, the mobile device 255 may have stored in memory the GPS mapping table, the GPS system 315 may have sored in memory the GPS mapping table, and/or an external device such as server 230 (see FIG. 2) may have the GPS mapping table stored in memory.

The GPS signal that is repeated in a given location (e.g., room 330 of FIG. 3B) may be sourced from an area (e.g., rooftop antenna 320) local to the given location or may be provided to the site from an area miles away. This is because the GPS calculation is relevant only to the location mapped to in the GPS mapping table (again, see the example of FIG. 9 and accompanying description). This calculation and subsequent GPS mapping may provide a close approximation to the actual location mobile device location when the GPS repeater feed is local. However, the calculation and subsequent GPS mapping also may be used as a security measure when the GPS signal is sourced from a GPS receiver that may be miles away from the mobile device location. That is, even when the GPS repeater feed is from a locally-installed GPS antenna, the local GPS system may be installed with sufficient cable lengths that the computation of mobile device GPS location is deliberately obfuscated. Thus, the GPS location calculation and mapping provides obfuscation of the actual GPS location while still allowing a monitoring system (see, e.g., FIGS. 8A-8C) to process the information to a close approximation of the signal based on the granularity of the employed GPS mapping grid.

In an example, the computed location may include the latitude, longitude, and altitude of the mobile device. By using such a three-dimensional calculation, a single signal may be deployed to multiple sites of a GPS mapping grid when only the altitude may vary in the location calculations. Additionally. the same GPS signal may be used to calculate different mobile device GPS locations based on the repeated signal in multiple sites. By pre-determining the results of the relative calculations from one site to another, a minimal number of independent feeds may be used to provide the GPS location calculation and GPS mapping to a site. This provides an efficiency in the deployment of the number of GPS repeaters to sites and leverages the same effectiveness in obfuscating the mapped GPS location.

The following example process may be used to obtain a mobile device location. A mobile device enters the coverage area of a communications network. An application executing on a device within the communications network requests the GPS location from the mobile device. The mobile device gathers the repeated GPS information and sends the repeated GPS information back to the communications network. The communications network computes the GPS location of the mobile device (this is the obfuscated GPS location of the mobile device). The communications network sends the computed GPS location to the requesting application. In an example, the communications network also maps the computed GPS location to a table of defined GPS locations to establish the actual location of the mobile device. Alternately, the local GPS system performs the GPS location mapping and retains the actual GPS location of the mobile device. In another example, the mobile device itself computes the GPS location (the obfuscated location), provides the computed GPS location to the communications network for subsequent transfer to the requesting application, and the mobile device itself executes the GPS mapping function and retains its actual GPS location.

Returning to the example environment 200 of FIG. 2, mobile device 255 is shown located within the volume of building 900. However, mobile device 255 also is in the coverage area of communications network 210 established using the cell tower 240 and router 235. Thus, upon entry into the coverage area of the communications network 210, mobile device 255, which is both WiFi and cellular-enabled, may be compelled to register with the communications network. Following registration of the mobile device 255, the communications network 210 may identify the mobile device 255 and its characteristics. The mobile device 255 characteristics may be tied to a phone number of the mobile device subscriber number (wireless phone number), or other identifying information. In addition to the communications network 210, the entity operating building 900 may establish a local wireless network, and may use that network to control wireless access within building 900. An example of such an access-limited RF coverage area is one established for an Embassy or a prison. In addition, the local wireless network may be employed to limit wireless communications based on date or time of day, for example, by broadcasting a signal that mimics a corresponding signal from communications network, but that may have a stronger signal strength. The mobile device 225 receives the broadcast signal and responds with a location update and access request.

Figure 4:
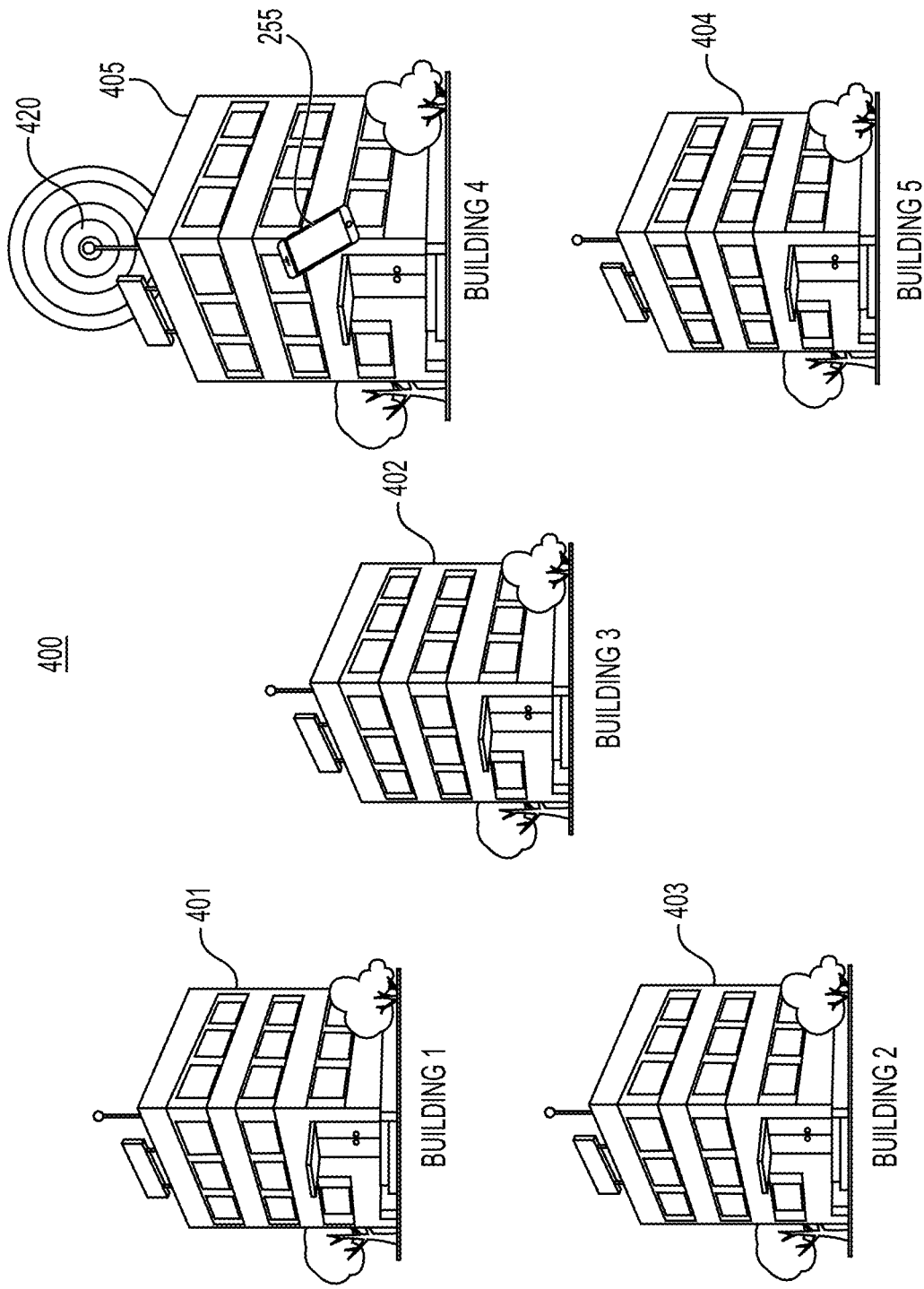
FIG. 4 illustrates another example implementation in which a GPS repeater is employed to provide mobile device location in which the mobile device cannot adequately access GPS broadcast data.

FIGS. 3A and 3B illustrate an implementation of the herein disclosed systems and methods in the context of a single building. A similar implementation may be invoked for a building complex. FIG. 4 shows such an implementation. In FIG. 4, building complex 400 includes five separate buildings 401-405. Building complex 400 includes local GPS system 410. System 410 includes a single GPS rooftop antenna 420 installed on building 405 (although additional antennae may be installed). System 410 further includes a processor system (not shown, but similar to that of FIGS. 8A-8C) and one or more GPS repeaters, also not shown, in each of the buildings 401-405. Also not shown are cables that couple the GPS repeaters to the GPS antenna 420. In an aspect, an application executing in a communications network such as the network 210 of FIG. 2 may request the location of mobile device 255, shown in FIG. 405. A procedure similar to that discussed with respect to FIGS. 3A and 3B may be carried out in the example of FIG. 4. The end result is that the entity requesting the location of the mobile device 255 would know the position of the device inside of the appropriate building based on the device location returned in response to the GPS location request. Note that if GPS system 410 is implemented to provide obfuscated GPS location, the entity requesting the location of the mobile device 255 would receive a computed and obfuscated GPS location and not the actual location of the mobile device 255. If the mobile device 255 happened to be outside the buildings 401-405, traditional GPS methods computed through the device may be employed because the mobile device 255 would see the appropriate GPS signals from the GPS satellites 260.

In the examples of FIGS. 3A, 3B, and 4, further application of the GPS mapping technique may provide a greater granularity of the mobile device location information by, for example installing additional GPS antennae on the rooftop of the same building and providing a separate repeated signal on each floor of the building. The GPS location on the rooftop then may be translated to a specific floor of the building to associate the actual mobile device location with the computed mobile device GPS location.

This same approach may be used to create a grid within a building, or to identify a particular room or area of a floor from building from another. Each location to be identified requires a separate GPS signal and hence a separate GPS repeater. Because the GPS value is mapped to the physical area of the repeated signal, the actual GPS value is irrelevant to the actual device location. This method may be used for scenarios where the actual location of a mobile device is a controlled (e.g., classified) information and should not be made available to standard GPS calculation systems and standard GPS location aware applications. That is, in cases of national security or situations such as at corrections institutions where devices are prohibited, the actual mobile device GPS location could constitute a security breach and thus the actual GPS location may be obfuscated and the obfuscated value provided to a location aware application.

Figure 5:
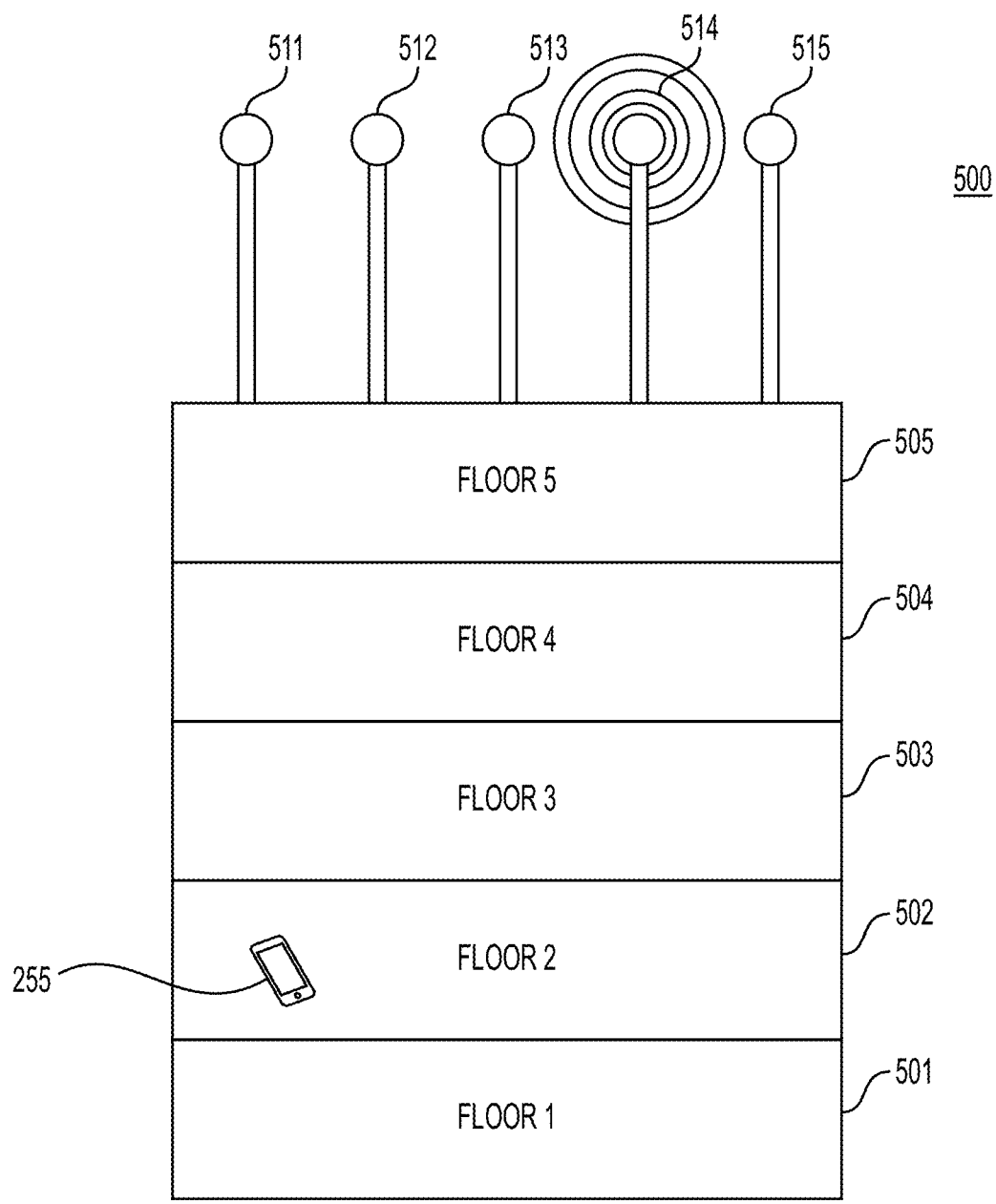
FIG. 5 illustrates yet another example implementation in which a GPS repeater is employed to provide mobile device location.

FIG. 5 illustrates another example employment of the herein disclosed systems and methods. Inside individual building 500, a mapped GPS location may be applied to each floor 501-505. In this scenario, each floor has a separate GPS repeater (not shown) feeding individual information from corresponding roof top antennae 511-515 on a per floor basis. The process of locating the mobile device 255 is the same as in the examples of FIGS. 3A, 3B, and 4. However, with multiple floors, multiple GPS signals sourced from different locations (e.g., different antennae 511-515) provide discrimination among floors of building 500, possibly obviating the need for altitude computations and providing greater granularity of mobile device location.

Figure 6:
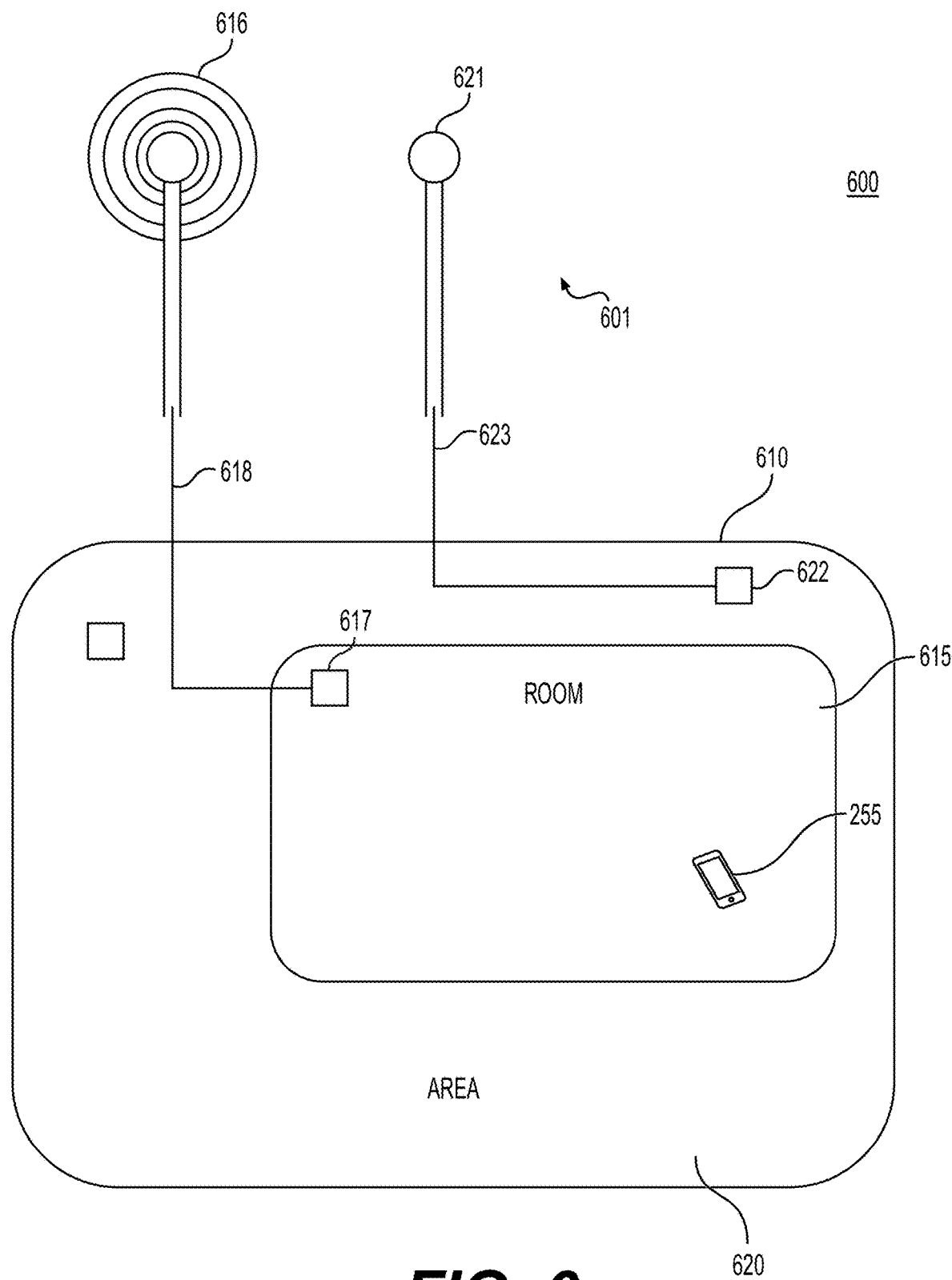
FIG. 6 illustrates still another example implementation in which a GPS repeater is employed to provide mobile device location.

As shown in FIG. 6, the herein disclosed systems and methods may be extended to cover multiple areas of building 600 in which building area 610 includes room 615 and area 620 surrounding room 615. The building 600 has installed GPS system 601, which includes GPS antenna 616 associated with room 615 and antenna 621 associated with area 620. Both the room 615 and area 620 have installed a GPS repeater 617 and 622, respectively, with each GPS repeater coupled to their associated antenna by respective cables 618 and 623. The deployment of the repeated GPS signal may be used to differentiate between room 615 and area 620, thereby creating a border between operational areas that may be used to control services provided to mobile device 255. For example, room 615 may require restricted access for communications services while the area 620 (e.g., a hallway outside room 615) is a less restricted or unrestricted area. In these scenarios, two disparate GPS feeds may be repeated in the two areas (room 615 and area 620) creating a separation in the computed GPS locations, which allows determination as to whether the mobile device 255 is inside or outside room 615 and correspondingly whether appropriate service restrictions should be or need not be applied to mobile device 255.

A similar strategy and corresponding deployment of a local GPS system with separate GPS antennae and corresponding GPS repeaters may be used to provide temporal service restrictions on mobile devices in a specific area or areas. For example, a facility may wish to provide obfuscated GPS locations during certain hours of the day, days of the week, or for specific events.

Figure 7:
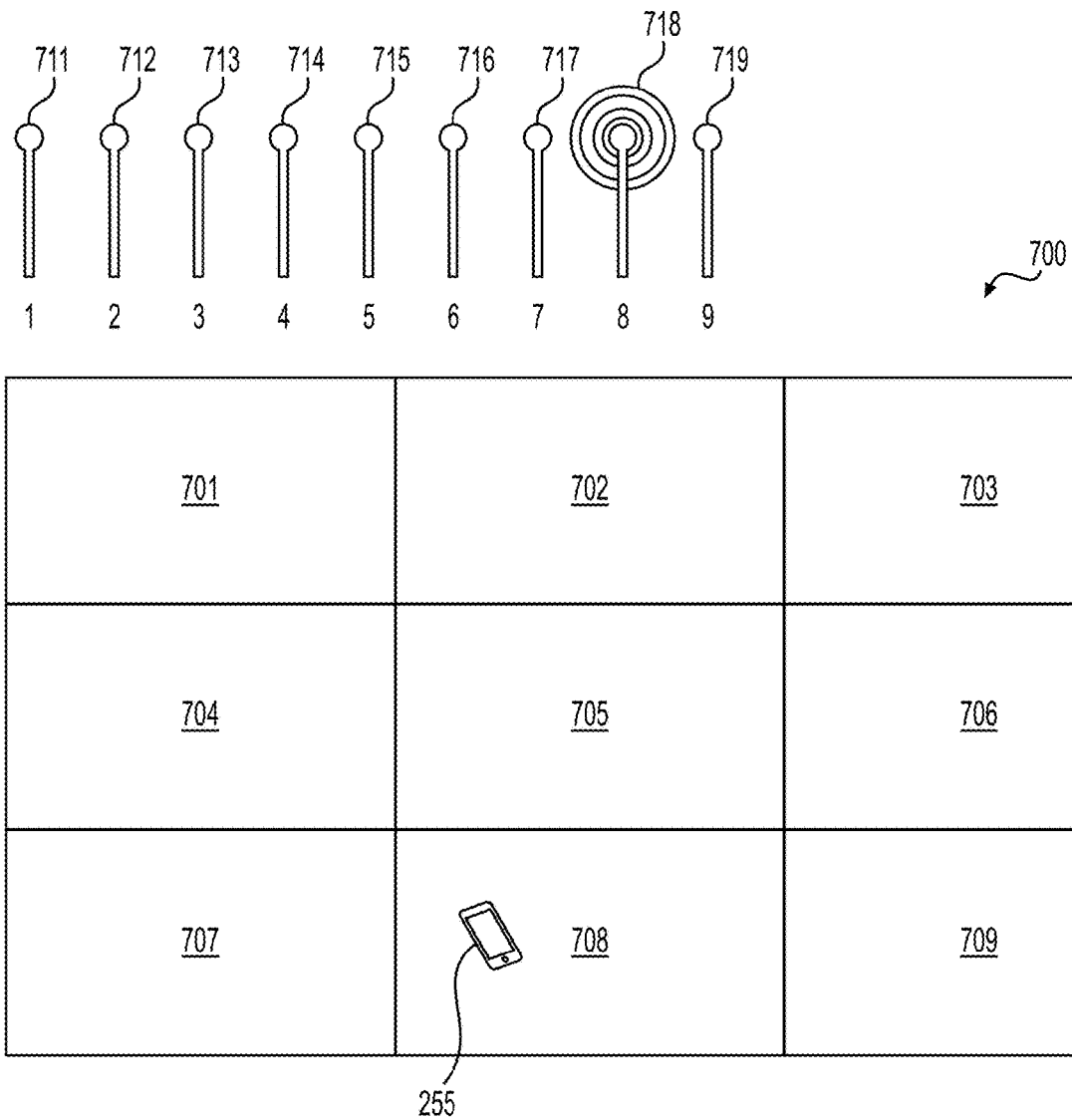
FIG. 7 illustrates a further example implementation in which a GPS repeater is employed to provide mobile device location.

FIG. 7 illustrates a grid-like implementation of the herein disclosed systems and methods as applied to a single room 700 that as can be seen, is divided into a grid defining nine areas 701-709, each area fed by its own GPS antennae 711-719 and each having its own GPS repeater (not shown). For this type of deployment, each area 701-709 in the grid is provided a unique repeated GPS signal that allows the GPS mapping function to determine a relative location of mobile device 255. Alternately, a single GPS antenna may provide nine separate and hence different feeds, and a computed mobile device location will indicate in which grid the mobile device 255 is located.

As the examples of FIGS. 2-7 illustrate, an entity controlling a facility such as building 900 may desire to track the location of mobile devices while those mobile devices are located within the facility. The disclosed systems and methods provide this functionality, and when implemented, may be used to determine, for example, if an unauthorized, unknown, or restricted mobile device is located in a secure area such that the presence of the mobile device in the secure area would constitute a security breach.

In the examples of FIGS. 2-7, for controlled environments as well as "walled gardens," knowledge of mobile device locations may be a critical component of the proper operation of the network and the proper allocation or restriction to/from services. A question remains as to how often the location information can or should be obtained from the mobile device or how often that information needs to be collected to create a desired operational state.

Periodic or episodic retrieval of mobile device location information may be driven by the technology of the mobile device. In the case of earlier generations of technology, the communications network may establish a periodic registration from the mobile device that compels the device to send location information to the communications network on a predetermined time basis. With more recent generations of wireless technology, the communications network can initiate such locations requests for mobile devices in a dormant state, once again compelling the mobile device to send the information to the communications network based on a network-initiated location request. This location request could be the result of a preset operational parameter occurring every 5 seconds or every 5 minutes. Alternatively, this location information could be demand based initiated by the communications network as a result of a received request to locate the mobile device.

The frequency of the GPS location calculation also may be based on the type of deployment and the velocity of movement of a particular mobile device. For example, if the system is deployed within a grid sized at 200×200 feet per square, and the average speed of walking is 4 feet per second, the frequency of the collecting the mobile device location information may be set to every 40 seconds based on the relative movement an average person may have within that time (40*4=160 feet). If the system is deployed within a building and involves a cell boundary, periodic checking of the location may only be required every few minutes to reconfirm the location inside the building.

In the situation of a conference room within the building, movement of a few feet could transition from a non-restricted to a restricted status in a matter of a couple seconds. In this case, the frequency of the location calculation may provide a more precise tracking of movement of the mobile device.

The systems may incorporate mechanisms to standardize delay or offset. The deployment of the GPS signal repeaters can be challenging to gauge because the delay introduced in the repeated signal impacts the actual location calculated. To alleviate such problems, the GPS repeaters may be installed with known configurations by using preconfigured repeater installation kits. For example, a kit may come with a specific length of cable to produce a specific delay or offset. These preconfigured kits allow the introduced delay to be known for a given location when establishing a GPS mapping table without the need for post-installation testing.

Additionally, depending on the level of obfuscation required, the length of delay or offset introduced may be modified so that if the mobile device itself does the calculation, the location represented will not be aligned with the mobile device's actual location unless the mobile device is equipped with the GPS table information to produce the actual location.

With the herein disclosed system, if a mobile device location represents an actual location in an area that could fall directly outside or inside a restricted area, the source of the GPS repeater may need to be adjusted so that the GPS signal provides the differentiation required to distinguish between an obfuscated location and an actual location.

The deployments shown in FIGS. 2-7 may include one or more computing systems for computing mobile device GPS locations and for other processes. The computing system may be a component of a local GPS system such as the GPS system 315 of FIG. 3B, a component of a mobile device such as mobile device 255, and/or a component of a network entity such as server 230 of FIG. 2 that is external to the facility, building, or structure for which obfuscated GPS locations are desired. Thus, the computing system may be installed as a component of a commercial wireless network, a local area network, or a private network, or a local GPS system installed at a facility or building. A local or private network may be established for an organization and may serve only mobile devices authorized by the organization. In an aspect, non-authorized mobile devices may attempt communications in the network of which the computing system is a component.

FIG. 8A illustrates an example system 800 for implementing obfuscated mobile device locations. In FIG. 8A, system 800 includes a receive section 810 and a monitoring section 820. The receive section 810 includes one or more GPS antennae 811. Each GPS antenna 811 is connected to one or more GPS repeaters; in FIG. 8A, GPS antenna 811 is coupled to GPS repeater 815 by a length of cable 813. In an example, the cable 813 is an RF cable. In another example, the cable 813 is an optical cable; in this example, the receive section 810 will include, at the GPS antenna 811, hardware devices (see the example of FIG. 8C) to baseband the RF signal, convert the signal to a digital optical signal, and reverse that process at the GPS repeater 815. The actual cable length chosen will affect the apparent, computed, or obfuscated GPS location of mobile device 801 as opposed to the actual location of mobile device 801. As a general matter, the longer the cable 813, the greater the distance between the actual mobile device location and the computed (or apparent) mobile device GPS location. In an aspect, the mobile device 801 may acquire GPS position information through the antenna 811, cable 813, and GPS repeater 815.

In some implementations, the system 800 may include monitoring section 820, which in turn may include wireless system controller 821 and computing system 823. Components of the computing system 823 are shown in more detail in FIG. 8B. The controller 821 may include a base station controller or other radio frequency (RF) control device that are employed to create communications network 800a. Alternately, the controller 821 may be an adjunct to a larger wireless communications network. The controller 821 may implement any wireless technology or technologies including 2G, 3G, 4G Lte, and 5G. The controller 821 also may implement WiFi services. The controller 821 may detect when a mobile device enters a coverage area of the network 800a, may compel registration with the controller 821, and may request a location update from the mobile device 801.

The computing system 823 may implement a GPS mapping table function 825 that is used in the process of determining mobile device location based on received GPS signals at antenna 811. That is, computing mobile device GPS location at or near repeater 815, which is an obfuscated GPS location in that the extra cable length of cable 813, imposes an extra delay in signal transmission between the GPS antenna 811 and the GPS repeater 815. The GPS mapping table function may be used to compute cable lengths to produce a desired location offset, to generate the GPS mapping table, in addition to use the GPS mapping table to determine an actual location of a mobile device (see the example of Table 1, below).

FIG. 8B illustrates example components of the computing system 823. In FIG. 8B, computing system 823 can be seen to include processor 823a, non-transitory computer-readable storage medium 823b, memory 823c, input/output (I/O) 823d, and communications link 823e, which couples these components. The machine instructions of the GPS mapping table, GPS location determinations, and actual mobile device locations may be stored in non-transitory computer-readable storage medium 823b, and the machine instructions are loaded into memory 823c and executed by processor 823a to produce the required GPs mapping table, and in some examples, actual and computed GPS locations. The I/O 823d may be used to produce a human readable output, such as the GPS mapping table, and to receive inputs from human operators and from other computing devices, components, systems, and networks.

FIG. 8C illustrates additional, and in some examples, optional components of the receive section 810. For example, the receive section may include an RF front end 810a, an analog to digital converter 810b, optical cable connector 810c, as well as corresponding components 810d to convert an optical signal to an RF signal at the GPS repeater 815. In addition, the receive section 810 may include an isolation switch 810e to isolate GPS repeater 815. The GPS repeater, in some examples, may include optional components including a local GPS receiver 815a and a processor 815b, which may be used to determine GPS location at the GPS repeater 815, and to provide the thus-determined GPS location outside of the receive section 810. The GPS repeater 815 may additionally include memory 815c in which may be stored a computed GPS location of the GPS repeater 815. Furthermore, depending on the implementation, the system 800 may include multiple receive sections 810, such as a separate receive section for each GPS antenna 811 in the system 800. The receive section 810 may include multiplexers (not shown) to multiplex optical signals. Where multiple GPS repeaters 815 are used with a single GPS antenna, the receive section may include connects to link the GPS repeaters 815 is series.

Figure 8D:
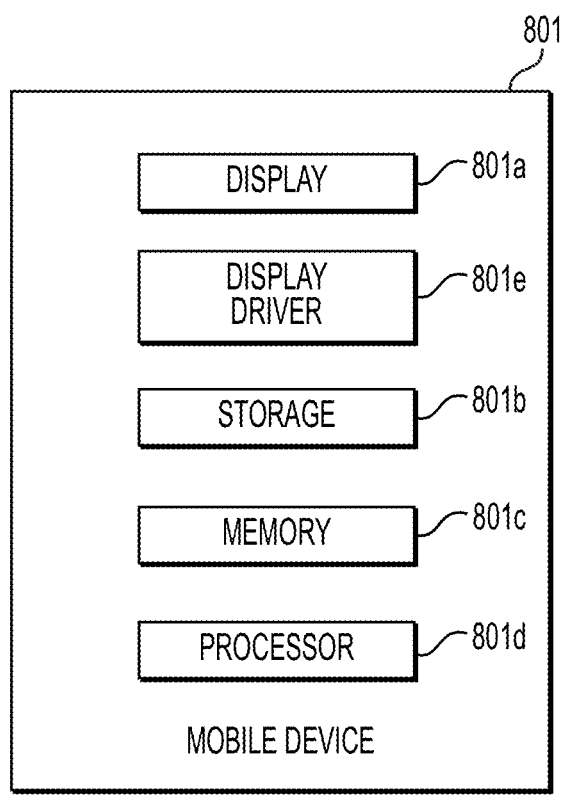
FIG. 8D is a block diagram illustrating components of a mobile device operable with the system of FIGS. 8A-8C.

FIG. 8D illustrates a block diagram of mobile device 801. In FIG. 8D, mobile device 801 includes display 801a and non-transitory computer-readable storage medium 801b storing instructions that, inter alia, when executed, generate a computed GPS location and, when implemented, allow determination of actual GPS location based on a GPS mapping table, which also may be stored in storage 801b. Mobile device 801 further includes memory 801c, processor 801d, and display driver 801e.

Figure 9:
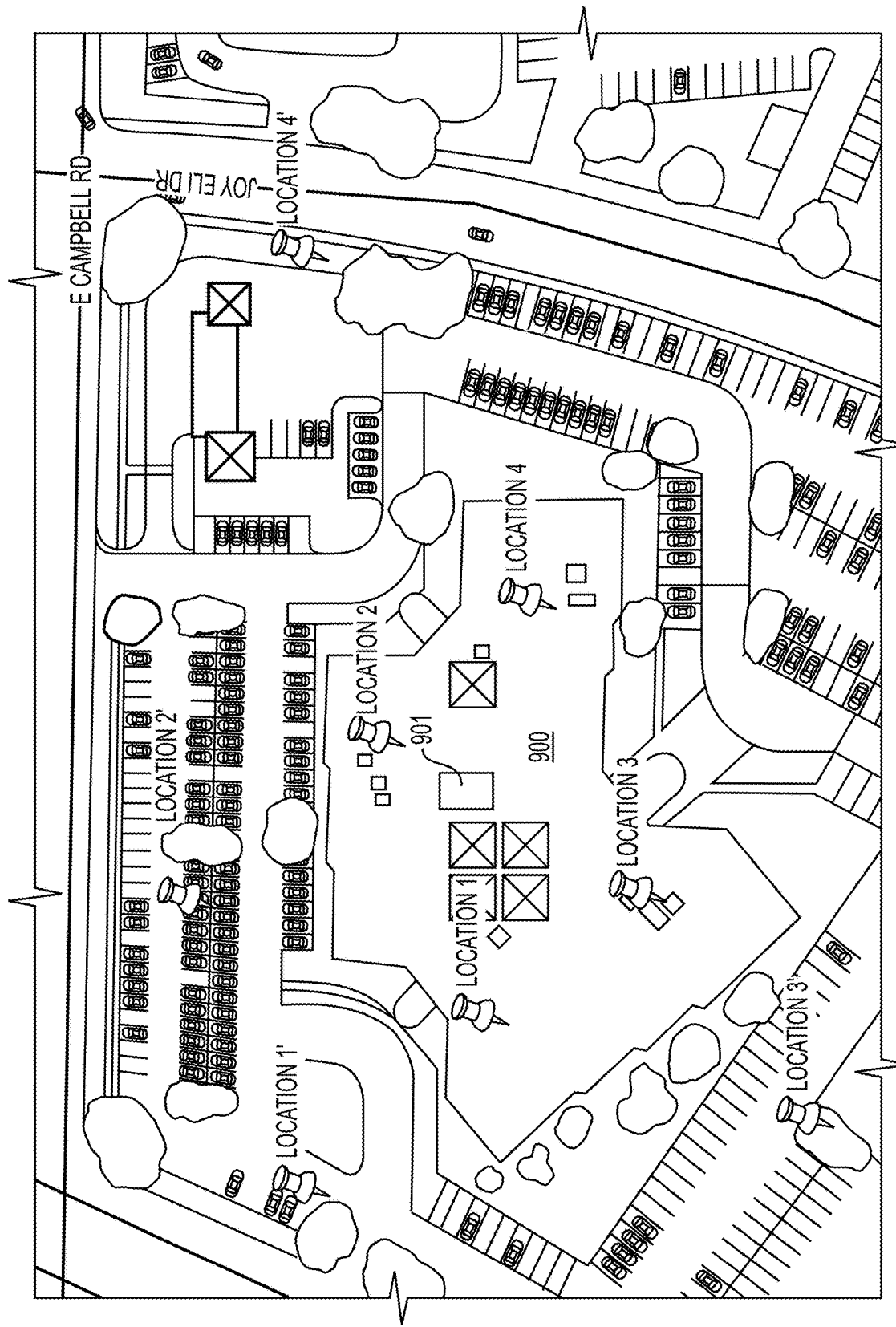
FIG. 9 illustrates an example mobile device location through obfuscation executed by the system of FIGS. 8A-8C.

FIG. 9 illustrates an application of the system 800. In FIG. 9, building 900 is shown with four pre-determined locations (locations 1-4) that are known and that are provided in the example GPS mapping table (Table 1) below, with the position information provided in terms of latitude, longitude, and altitude. Corresponding to each of the locations 1-4 are obfuscated locations 1'-4'. The obfuscated locations 1'-4' are determined by a length of cable connection between a GPS antenna and a GPS repeater. The longer the cable length, the more delay is imposed on signal transmission, and the further an obfuscated (computed) location may be from an actual mobile device location.

In an aspect, the pre-determined locations are determined by taking location measurements at various "actual" locations within building 900 and then identifying these pre-determined locations as actual locations. Since each of the actual locations of a mobile device is known, the difference between the actual locations and computed locations shown in the example of Table 1 are the offsets that may be expected for any mobile device at or near any of the actual locations (that is, at or near the GPS repeaters). In practice, a mobile device at actual location 1 that performs its own GPS location calculation would report a computed location of 1'. Again, if the cable length is a true reflection of the straight-line distance between the exterior GPS antenna and the GPS repeater, the computed GPS location of location 1' would be close to the actual location 1. However, when the intervening cable is lengthened to impose additional delay, the computed location will differ, increasingly so, from the actual location as cable length is increased. The monitoring system 823 shown in FIGS. 8A and 8B then would correlate the computed (obfuscated) location 1' with actual location 1, and would report the mobile device at computed location 1' while, at the same time, the mobile device 801 would display its position as being at actual location 1. Furthermore, applications requesting the location of the mobile device would be presented with computed location 1' when in fact the mobile device is/was at actual location 1.

TABLE 1

Example GPS Mapping Table

Actual Location

| Location | Latitude | Longitude | Altitude |
| --- | --- | --- | --- |
| Location 1 | 32, 58, 28, 72N | 96, 42, 40.76W | 648 |
| Location 2 | 32, 58, 28.90N | 96, 42, 39.05W | 649 |
| Location 3 | 32, 58, 27.41N | 96, 42, 39.94W | 647 |
| Location 4 | 32, 58, 28.04 | 96, 42, 38.18W | 648 |

Computed Location

| Location | Latitude | Longitude | Altitude |
| --- | --- | --- | --- |
| Location 1' | 32, 58, 29.34N | 96, 42, 41.98W | 645 |
| Location 2' | 32, 58, 30.09N | 96, 42, 40.15W | 648 |
| Location 3' | 32, 58, 26.54N | 96, 42, 41.18W | 648 |
| Location 4, | 32, 58, 29.40N | 96, 42, 35.91W | 648 |

FIGS. 10A-12 are flow charts that illustrate example operations or methods for leveraging GPS repeaters to locate devices and to obfuscate device location. As used herein, the terms "device" and "mobile device" refer to platforms that are GPS capable; that is, the platforms that include a GPS receiver by which the platform may receive GPS signals and either compute GPS location based on the received GPS signals, or pass the GPS signals to another platform that computes GPS location. In many cases, the devices are easily portable. The flow charts include steps or operations that may be performed in the sequence illustrated, or in other sequences. Moreover, all steps or operations need not be performed. Further, the flow charts may include steps or operations in addition to those illustrated and described. Still further, steps and operations in one flow chart may be included in other flow charts. For example, an operation of reporting actual GPS location may or may not be performed, may be performed in a sequence other than illustrated or described, or may be performed by platforms, components, or systems other than those stated in the flow chart descriptions or illustrated in the flow charts themselves. The operations may be applied in various scenarios, including those shown in FIGS. 2-7. In some of these scenarios, a mobile device may be located in an area or facility and is unable to obtain an unobstructed view of a sufficient number of GPS satellites to obtain a GPS location. In some scenarios, a mobile device may be located in or near a restricted area of facility, and thus may be prohibited from transmitting its actual GPS location or even its obfuscated location. A mobile device may be prompted or requested to provide a GPS location in response to execution of a location aware application or in response to a registration request, or similar communication, from a wireless network in which the mobile device is operating. A mobile device may be prompted to supply its GPS location in order to track movement of the mobile device in an area or facility.

Figure 10A:
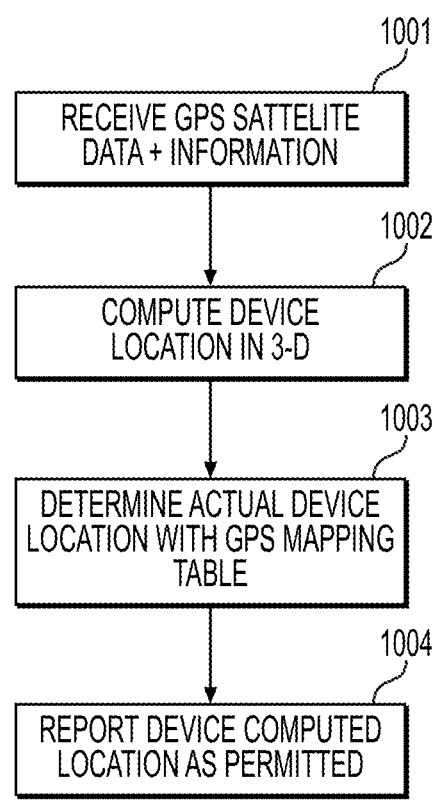
FIGS. 10A-12 illustrate example methods for leveraging GPS repeaters to locate devices and to obfuscate device location.

FIG. 10A is a flowchart illustrating an example operation of method for leveraging GPS repeaters to locate devices and to obfuscate device location. The operation of FIG. 10A may be implemented in the environment of FIG. 9. In FIG. 10A, operation 1000 begins in block 1001 with receipt of GPS satellite data and information. In general, the GPS satellite data and information must include data and information sourced from at least four GPS satellites in order to produce an accurate three-dimensional (3-D) GPS location of a device such as device 901. Receipt of data and information from more than four satellites may improve the accuracy of the device location computation. The GPS satellite data and information, from which the latitude, longitude, and altitude of device 901 is to be determined most likely would be sent to all GPS repeaters in building. Assuming, for example, that building 900 includes four separate GPS repeaters, each GPS repeater would receive, and then rebroadcast, the GPS data and information. However, the GPS satellite data and information may be acquired from one to four GPS receive antennae. Thus, one antenna may feed all four GPS repeaters, each of four GPS receive antennae may feed corresponding GPS repeaters, or any combination of antennae may be coupled to respective ones of the GPS repeaters. In the configuration of building 900, it is expected that were four GPS antennae employed, each antenna would receive GPS data and information from all GPS satellites in view by the GPS antennae. Furthermore, the GPS antennae may be directional or omni-directional.

Following block 1001, operation 1000 moves to block 1002, and the received GPS satellite data and information are used to compute a GPS location of mobile device 901. Note that because mobile device 901 is closest to a GPS repeater at location 1, the location 1 GPS repeater likely is the source of GPS data and information received at mobile device 901. The computed GPS location of mobile device 901 is based on the signal transmission time from the GPS satellites to the GPS antenna, the additional signal transmission time from the GPS antenna to the GPS repeater, and further, the additional signal transmission time from the GPS repeater to the GPS receiver in the mobile device 901. However, the additional signal transmission time from the GPS repeater to the mobile device 901 should be de minimis compared to the other two signal transmission times. The second signal transmission time, from the GPS antenna to the GPS repeater is deliberately chosen so as to make the computed GPS location of the mobile device 901 appear to be different from the actual location of the mobile device 901. This obfuscation of GPS location is based on the addition of cable between the GPS antenna and the GPS repeater sufficient enough to impose a signal transmission delay that appears to show mobile device at location 1' rather than at its actual location.

In block 1003, the actual location of mobile device 901 is determined when a processor executes machine instructions to use the computed GPS location as determined in block 1002 as an entering argument in a pre-defined GPS mapping table such as example Table 1 disclosed above. Table 1 provides computed GPS values in terms of latitude and longitude in degrees, minutes, seconds, and a fraction of seconds, and altitude in feet. The computed values recorded in Table 1 are what would be computed by a GPS receiver at the actual location of a GPS repeater, and actual locations of the GPS repeaters may be established during installation of the GPS repeaters.

Following block 1003, the operation 1000 moves to block 1004 and the mobile device's computed GPS location is reported, as permitted, to the entity or service requesting the location. The same computed GPS location also may be displayed at the mobile device 901. Such display may be, for example, a map illustrating natural and man-made features, and may include a pin or similar device to illustrate the computed GPS location of mobile device 901. Since the computed GPS location is intended to be obfuscated, an operator of mobile device 901 might be surprised to see that his mobile device apparently is located outside building 900 when in fact he and his mobile device are at location 1 inside building 900. The mobile device operator simply might conclude that the GPS location discrepancy is due to a faulty GPS computation rather than a deliberate plan to provide a false or obfuscated GPS location. Also, as an aspect of block 1004, the actual location of mobile device 901 may be reported, stored, and displayed to, for example, security personnel in building 900. The actual location would not, in general, be reported to the entity requesting the GPS location. For example, were mobile device 901 registered with a communications network encompassing the area of building 900, the communications network might prompt the mobile device 901 to provide periodic location updates, using either cellular means (cell tower triangulation, for example) or from GPS satellites, or a combination of cellular and GPS (e.g., assisted GPS). In this situation, the mobile device 901 may be controlled when within building 900 to report only computed GPS location (which is obfuscated). In addition, building 900 operators may establish communications controls over mobile devices within building 900 such that no location updates are provided or only obfuscated GPS locations are provided. However, security personnel in building 900 could initiate a request for mobile device location, and in that case, both the actual and computed (obfuscated) GPS locations would be reported to the same entity, building 900 security.

Figure 10B:
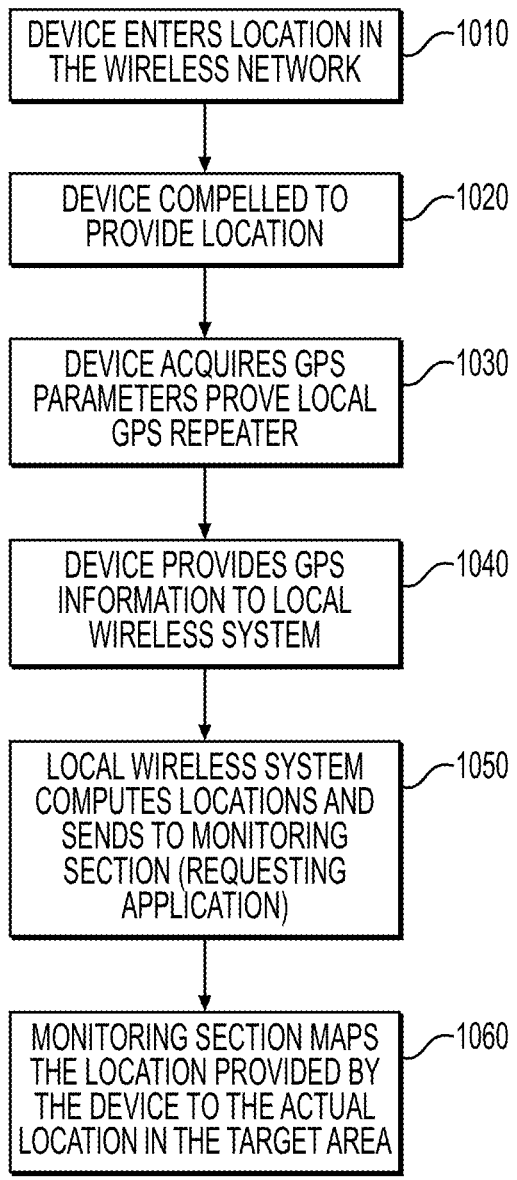

10B is another flowchart illustrating an example operation for leveraging GPS repeaters to locate devices and to obfuscate device location. The operation of FIG. 10B may be implemented in part by system 800 of FIGS. 8A-8C operating in the environment of FIG. 9. In FIG. 10B, operation 1000' begins in block 1010 when mobile device 901 enters a coverage area of a wireless network and is detected by components of the monitoring section 820. In block 1020, components of the monitoring section 820 compel the mobile device 901 to register with the wireless system 821 and to provide a location update to the wireless system 821.

In block 1030, the mobile device 901 acquires GPS location data from local GPS repeater 815 (which would be positioned near location 1 shown in FIG. 9) and in block 1040, the mobile device 901 computes and provides the computed (obfuscated) GPS location (latitude, longitude, and altitude) to the system 800. In alternate block 1050, the mobile device 901 reports the GPS location data to the monitoring section 820 and the processor of computing system 823 computes the mobile device location (i.e., obfuscated location) and provides the computed location to the monitoring section 820. In block 1060, the monitoring section 820 maps the computed GPS location to the actual GPS location provided in a GPS location mapping table (e.g., Table 1, above) to identify the actual location of the mobile device 901. As is clear from FIG. 10B, the monitoring section 820 holds the actual location of the mobile device 901 while the mobile device itself, and possibly other applications, will see the mobile device at the computed (obfuscated) GPS location, which is offset from the actual location.

Figure 11A:
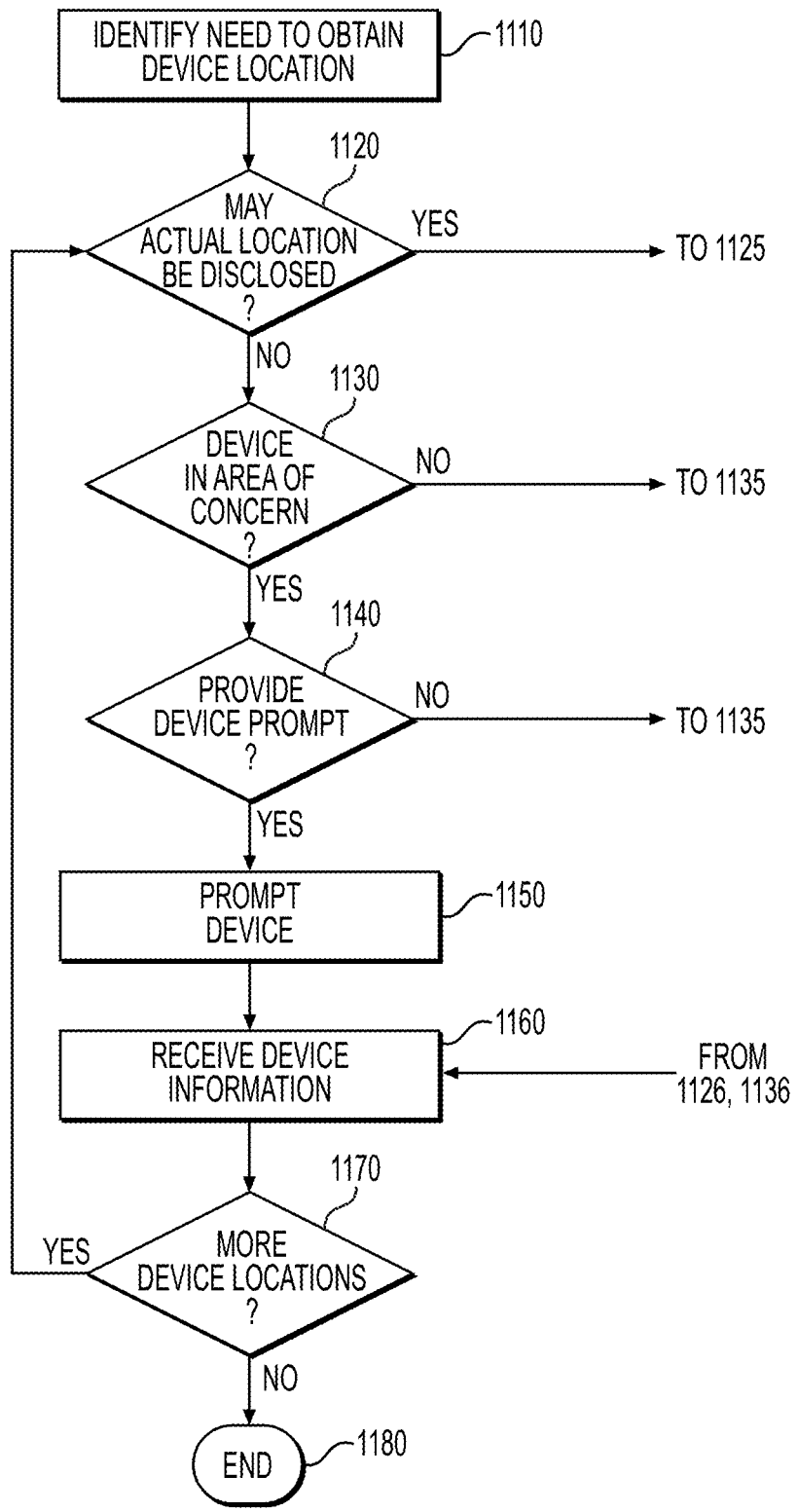

FIG. 11A is a flow chart illustrating another example operation for leveraging GPS repeaters to locate devices and to obfuscate device location. The operation of FIG. 11A may be implemented in part by the system 800 of FIGS. 8A-8C operating in the environment of FIG. 9. In an aspect, building 900 is a secured facility meaning that personnel access is limited, and use of certain devices, such as cameras, smart phones, and other recording and data transmission devices may be restricted in part or in all of building 900. In FIG. 11A, operation 1100 begins in block 1110 when components of system 800 (e.g., including monitoring section 820) identify a need to obtain mobile device locations from mobile devices such as mobile device 901. In block 1120, the monitoring section 820 determines whether or not actual mobile device location may be disclosed. If mobile device actual location may be disclosed, operation 1100 moves to block 1125. However, if mobile device actual location is not to be disclosed, operation 1100 moves to block 1130. In block 1130, the monitoring section 820 determines if a mobile device (e.g., mobile device 901) is in an area of concern. In this context, an area of concern may be any area or room in building 900 in which mobile devices are not to be allowed, certain areas adjacent to areas or rooms in which mobile devices are not to be allowed, and areas or rooms in which the disclosure of the presence of any mobile device, or a specific mobile device would constitute a security breach. Other areas of concern may be defined for other reasons. In block 1130, if no media devices are in or near an area of concern, operation 1100 moves to block 1135. In block 1130, if any mobile device may be in or near an area of concern, operation 1100 moves to block 1140. In block 1140, the monitoring system determines if the mobile device 901 should be prompted to provide a location update. In block 1140, if the monitoring section 820 determines not to provide a prompt, the operation 1100 moves to block 1135. If in block 1140, the monitoring section 820 determines to provide a prompt, operation 1100 moves to block 1150. In block 1150, the monitoring section 820 executes to allow the mobile device 901 to perform a GPS location update. The operation 1100 then moves to block 1160 and the monitoring section 820 receives the GPS information in the form of a computed GPS location for the mobile device 901. Alternately, the monitoring section 820 receives GPS data and information produced at the GPS repeater. The operation 1100 then moves to block 1170, and the monitoring section 820 determines if additional computed GPS location instances are to be produced. If no additional computed GPS locations are needed, the operation 1100 moves to block 1180 and ends. Otherwise, operation 1100 returns to block 1110 and the operation of block 1120-1170 repeat.

In some examples, a mobile device operating in an area or facility may (1) have a clear view of a sufficient number of GPS satellites so as to obtain a two or three-dimensional GPS location, and (2) may be operating in a portion of the area or facility in which reporting of actual GPS location is allowed. In this, and in other circumstances, the mobile device may execute operation 1125a, shown in the flow chart of FIG. 11B to calculate and report its actual GPS location. The impetus for calculating and reporting its actual GPS location may derive from a location request from a location aware application executing on the mobile device itself, from an application executing on a wireless communications network with which the mobile device is registered, and from the communications network itself requesting a location update, for example. Such a scenario could occur, for example, were the mobile device location between the buildings shown in FIG. 4. However, in some implementations of a campus-like facility, the facility may establish a local wireless network that compels all or some wireless devices in its coverage area to register with the local wireless network, locks the mobile wireless devices to the local wireless network, and prevents transmission of messages from the mobile device to an outside or external wireless network. In this modification of the campus scenario of FIG. 4, the mobile device still may calculate actual GPS location, but will not be able to provide that actual GPS location to any entity outside the local wireless network.

Figure 11B:
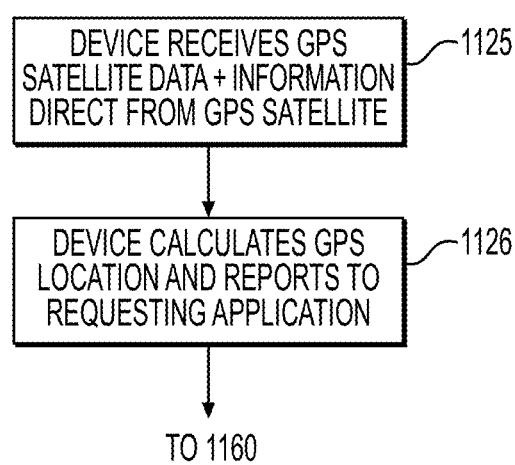

In FIG. 11B, operation 1125a may follow from operation 1100 of FIG. 11A, block 1120. Operation 1125a begins in block 1125 when a mobile device receives GPS satellite data and information directly from a constellation of GPS satellites. In block 1126, the mobile device calculates its actual GPS location from the GPS satellite data and information, and reports the actual GPS location to the requesting application, service, or entity. Following block 1126, operation 1125a moves to block 1160, operation 1100 of FIG. 11A.

Figure 11C:
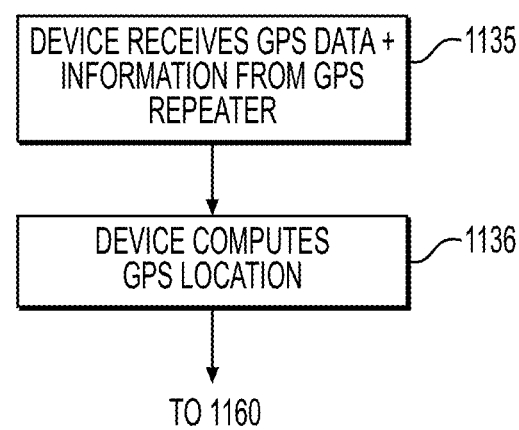

FIG. 11C illustrates operation 1135a, which may follow from operation 1100 of FIG. 11A, block 1130 (No) or block 1140 (No). In block 1135, the mobile device receives GPS data and information from a GPS repeater. In block 1136, the mobile device computes a GPS location based on data and information received from the GPS repeater. Thus, the computed GPS location is an obfuscated GPS location. Following block 1136, operation 1135a moves to block 1160 of operation 1100, FIG. 11A.

Figure 12:
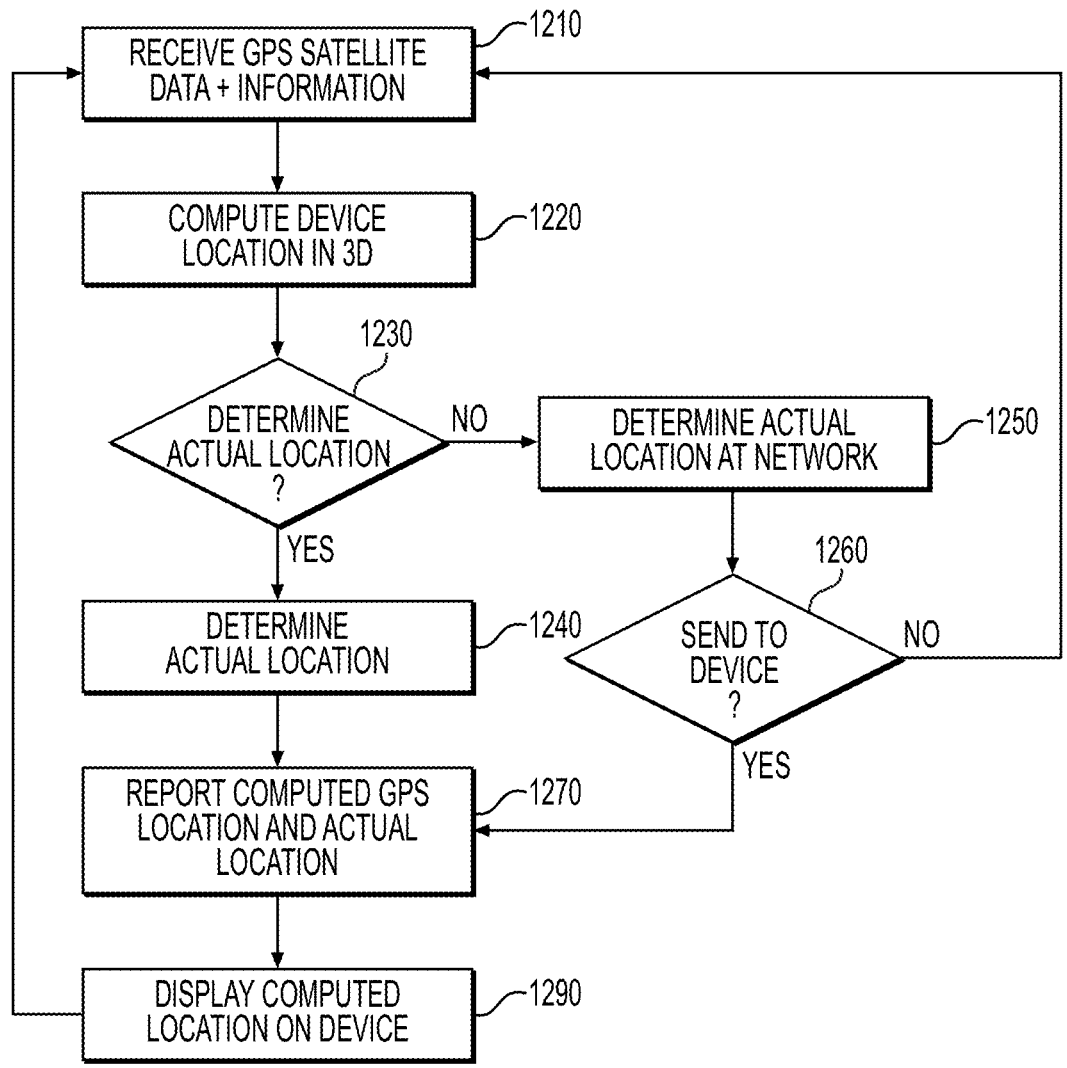

FIG. 12 is a flow chart illustrating operation 1200, at least a portion of which occurs on mobile device 901 as a consequence of a request for a location from mobile device 901 made by a location-aware service application, a component of a wireless communications network such as the communications network 210 of FIG. 2, or another communications network such as a local wireless network established for all or part building 900. In FIG. 12, operation 1200 begins in block 1210 when a GPS receiver receives repeated GPS satellite data and information. The GPS receiver may be located on mobile device 901. In block 1220, a processor in mobile device 901 executes instructions to compute mobile device GPS location in terms of latitude, longitude, and altitude. Alternately or in addition, a processor in monitoring system 823 may compute GPS location of mobile device 901. However, slight differences will exist in the computed values because the reference point for computation of GPS location for the monitoring section 820 may be at the GPS repeater 815 while the mobile device 901 likely will be displaced a small distance from the GPS repeater 815. In block 1230, a decision is made whether or not to determine actual GPS location of the mobile device 901 using a processor of the mobile device 901. In an aspect, if the mobile device 901 has in memory or storage, the appropriate GPS mapping table, then mobile device 901 determines the actual location of the mobile device 901. Thus, the process of block 1230 involves a mobile device onboard processor determining if the appropriate GPS mapping table is loaded into storage or memory. In block 1230, if the determination is Yes, operation 1200 moves to block 1240 and the mobile device processor determines, using the appropriate GPS mapping table, the actual location of mobile device 901. Following block 1240, operation 1200 moves to block 1270. In block 1230, if the determination is No, operation 1200 moves to block 1250. In block 1250, the monitoring section 820, or other components of the building 900 systems, determines the actual location of mobile device 901. Following block 1250, operation 1200 moves to block 1260, and a processor determines to send (Yes) the actual GPS location to mobile device 901, or determines not to send (No) the actual GPS location to mobile 901. Following block 1260 (Yes), operation 1200 moves to block 1290. Following block 1260 (No), operation 1200 returns to block 1210. In block 1270, mobile device 901 reports the computed GPS location to the requesting entity, and reports the actual GPS location to the monitoring section 820. The operation 1200 then moves to block 1290, and the mobile device 901 displays the computed GPS location of the mobile device 901 on a display of the mobile device 901, and stores the computed GPS location in memory of the mobile device 901. Following block 1290, operation 1200 returns to block 1210, and the operation 1200 repeats.

The preceding disclosure refers to flow charts and accompanying descriptions to illustrate the examples represented in FIGS. 2-9. The disclosed devices, components, and systems contemplate using or implementing any suitable technique for performing the steps illustrated. Thus, FIGS. 10A-12 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A system for obfuscating locations of mobile devices and for simultaneously determining and reporting both actual locations and obfuscated locations of the mobile devices, the mobile devices operating in a wireless communications network, the system, comprising:
    a receive section in wireless communication with a mobile device over the wireless communications network, and further in communication with one or more geo-position satellites (GPS), the receive section comprising one or more GPS receive antennae coupled by a corresponding cable to corresponding ones of GPS repeaters, wherein the mobile device is configured to compute and report a GPS location of the mobile device; and
    a monitoring section in wireless communication with the mobile device over the wireless communications network, the monitoring section comprising a processor in signal communication with a non-transitory, computer-readable storage medium having stored thereon, machine instructions and one or more mapping tables, wherein the processor accesses a mapping table function that relates an actual location of a GPS repeater to an obfuscated location of the GPS repeater, wherein a computed location of the mobile device is the obfuscated location of a nearest GPS repeater and an actual location of the mobile device is the obfuscated location of the nearest GPS repeater minus an obfuscation offset, wherein the processor reports one or both of the actual location and the obfuscated location of the mobile device.

2. The system of claim 1, wherein the obfuscation offset is established such that the obfuscated location of the mobile device is outside a predetermined boundary.

3. The system of claim 1, wherein the mobile device comprises a location aware application, wherein the location aware application executes to request a current GPS position of the mobile device.

4. The system of claim 3, wherein the mobile device reports only the obfuscated location as the current GPS position of the mobile device.

5. The system of claim 1, wherein the processor executes the machine instructions to prompt the mobile device to request a position update.

6. The system of claim 1, wherein the system is implemented in a confined, three-dimensional structure, wherein mobile devices entering the structure are prompted by the processor to request a position update.

7. The system of claim 1, wherein mobile device location obfuscation is implemented for defined time periods.

8. The system of claim 1, wherein the obfuscation offset is established by an offset length of the cable.

9. The system of claim 1, wherein actual locations of GPS repeaters account for cable lengths exclusive of an offset length of the cable.

10. The system of claim 1, wherein the obfuscation offset is established by delay characteristics of the GPS repeater.

11. The system of claim 1, wherein the wireless communications network is a local wireless network implemented as an overlay to an existing wireless communications network, the overlay having a defined, three-dimensional boundary, wherein mobile device location obfuscation is confined to mobile devices within a volume defined by the boundary.

12. The system of claim 11, wherein the obfuscated location of the mobile device is outside the volume.

13. The system of claim 11, wherein upon entry to the volume, mobile devices are compelled to register with the local wireless network, wherein mobile devices are locked to the local wireless network, wherein the mobile devices are prevented from externally reporting actual and obfuscated locations.

14. The system of claim 13, wherein the ab the mobile devices a scabies to display obfuscated locations.

15. The system of claim 13, wherein the mobile devices are enabled to display actual locations.

16. A non-transitory, computer-readable storage medium having encoded thereon, machine instructions executable by a processor for determining and reporting both actual locations and obfuscated locations of mobile devices, the mobile devices operating in a wireless communications network, wherein the processor executes the machine instructions to:

control a receive section of a wireless communication with one or more geo-position satellites (GPS), the receive section comprising one or more GPS receive antennae, each of the one or more GPS receive antennae coupled by a corresponding cable to one or more of a plurality of GPS repeaters, wherein the mobile devices are configured to compute and report a GPS location of the mobile device;

control a monitoring section in wireless communication with the mobile devices over the wireless communications network, wherein the processor accesses or more mapping tables, wherein a mapping table function relates an actual location of a GPS repeater to an obfuscated location of the GPS repeater, wherein a computed GPS location of the mobile device is the obfuscated location of a nearest GPS repeater and the actual location of the mobile device is the obfuscated location of the GPS repeater minus an obfuscation offset; and the processor reporting both the actual location and the obfuscated location of the mobile device.

17. The non-transitory, computer-readable storage medium of claim 16, wherein the obfuscation offset is established by an offset length of the cable.

18. The non-transitory, computer-readable storage medium of claim 16, wherein the obfuscation offset is established by delay characteristics of the GPS repeater.

19. The non-transitory, computer-readable storage medium of claim 16, wherein the wireless communications network is a local wireless network implemented as an overlay to an existing wireless communications network, the overlay having a defined, three-dimensional boundary, wherein mobile device location obfuscation is confined to mobile devices within a volume defined by the boundary.

20. The non-transitory, computer-readable storage medium of claim 19, wherein the obfuscated location of the mobile device is outside the volume.

21. A computer-implemented method for obfuscating locations of mobile devices operating in a wireless communications network and for simultaneously determining and reporting both actual locations and obfuscated locations of the mobile devices, the method, comprising:

a processor controlling a receive section in wireless communication with a mobile device over the wireless communications network, and further in communication with one or more geo-position satellites (GPS), the receive section comprising one or more GPS receive antennae coupled by a corresponding cable to corresponding ones of GPS repeaters, wherein the mobile device is configured to compute and report a GPS location of the mobile device;

the processor controlling a monitoring section in wireless communication with the mobile device over the wireless communications network, wherein the processor accesses one or more GPS repeater mapping tables, wherein a GPS repeater mapping table relates an actual location of a GPS repeater to an obfuscated location of the GPS repeater, wherein a difference between the actual location of the GPS repeater and the obfuscated location of the GPS repeater is established by an offset length of the cable, wherein the computed GPS location of the mobile device is the obfuscated location of a nearest GPS repeater and the actual location of the mobile device is the obfuscated location of the GPS repeater minus the obfuscation offset; and the processor reporting both the actual location and the obfuscated location of the mobile device.

* * * * *